US009900297B2

(12) United States Patent
Krzanowski et al.

(10) Patent No.: US 9,900,297 B2
(45) Date of Patent: Feb. 20, 2018

(54) SYSTEM, METHOD AND APPARATUS FOR SELECTING CONTENT FROM WEB SOURCES AND POSTING CONTENT TO WEB LOGS

(71) Applicant: salesforce.com, inc., San Francisco, CA (US)

(72) Inventors: Derek Krzanowski, Merrill, WI (US); Eric Weitner, Dobbs Ferry, NY (US)

(73) Assignee: salesforce.com, inc., San Francisco, CA (US)

( * ) Notice: Subject to any disclaimer, the term of this patent is extended or adjusted under 35 U.S.C. 154(b) by 676 days.

(21) Appl. No.: 14/059,268

(22) Filed: Oct. 21, 2013

(65) Prior Publication Data

US 2014/0047530 A1    Feb. 13, 2014

Related U.S. Application Data

(63) Continuation of application No. 12/020,170, filed on Jan. 25, 2008, now Pat. No. 8,595,635.

(Continued)

(51) Int. Cl.
*G06F 3/14* (2006.01)
*H04L 29/06* (2006.01)
(Continued)

(52) U.S. Cl.
CPC ........ *H04L 63/08* (2013.01); *G06F 17/30873* (2013.01); *G06F 17/30884* (2013.01); *G06F 21/33* (2013.01)

(58) Field of Classification Search
CPC .................................... G06F 3/14; G06F 3/17
(Continued)

(56) References Cited

U.S. PATENT DOCUMENTS 5,577,188 A    11/1996 Zhu
5,608,872 A     3/1997 Schwartz et al.
(Continued)

FOREIGN PATENT DOCUMENTS

WO    WO 98/44402 A1    10/1998
WO    WO 02/17162 A2     2/2002

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Ruay Ho
(74) *Attorney, Agent, or Firm* — Weaver Austin Villeneuve & Sampson LLP

(57) ABSTRACT

A method, system and apparatus for selecting, displaying, managing, tracking tagging and transferring access to specific content of Internet web pages and other sources, permitting the user or recipient to navigate quickly to a source of a content item in the custom selection, and posting content to web logs. A method and system of assisted content selection provides temporary borders around content items on mouseover; of Dynamic Content Display provides updating of selected content items; of Content Marks allows users to tag specific content items in web pages with a keyword or keywords, store a definition of the content item along with the keyword(s), and then search the stored definitions using search keywords; and a method of Multiple Clip Mode allows users to select specific content items from disparate source web pages and then tag, save, search, retrieve and print the selection.

20 Claims, 38 Drawing Sheets

Related U.S. Application Data

(60) Provisional application No. 60/897,449, filed on Jan. 25, 2007.

(51) Int. Cl.
    *G06F 17/30* (2006.01)
    *G06F 21/33* (2013.01)

(58) Field of Classification Search
    USPC .......... 715/760, 838; 707/706; 1/1; 345/419, 345/173; 709/202
    See application file for complete search history.

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,734,380 A | 3/1998 | Adams et al. |
| 5,751,283 A | 5/1998 | Smith |
| 5,754,175 A | 5/1998 | Koppolu et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,838,906 A | 11/1998 | Doyle et al. |
| 5,873,096 A | 2/1999 | Lim et al. |
| 5,877,765 A | 3/1999 | Dickman et al. |
| 5,893,091 A | 4/1999 | Hunt et al. |
| 5,897,644 A | 4/1999 | Nielsen |
| 5,918,159 A | 6/1999 | Fomukong et al. |
| 5,933,142 A | 8/1999 | LaStrange et al. |
| 5,963,953 A | 10/1999 | Cram et al. |
| 5,983,227 A | 11/1999 | Nazem et al. |
| 6,008,809 A | 12/1999 | Brooks |
| 6,023,275 A | 2/2000 | Horvitz et al. |
| 6,037,934 A | 3/2000 | Himmel et al. |
| 6,052,130 A | 4/2000 | Bardon et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,185,589 B1 | 2/2001 | Votipka |
| 6,189,011 B1 | 2/2001 | Lim et al. |
| 6,215,502 B1 | 4/2001 | Ferguson |
| 6,216,133 B1 | 4/2001 | Masthoff |
| 6,216,135 B1 | 4/2001 | Brodersen et al. |
| 6,216,141 B1 | 4/2001 | Straub et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,272,493 B1 | 8/2001 | Pasquali |
| 6,278,448 B1 | 8/2001 | Brown et al. |
| 6,288,717 B1 | 9/2001 | Dunkle |
| 6,289,362 B1 | 9/2001 | Van Der Meer |
| 6,295,530 B1 | 9/2001 | Ritchie et al. |
| 6,310,631 B1 | 10/2001 | Cecco et al. |
| 6,321,209 B1 | 11/2001 | Pasquali |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,396,500 B1 | 5/2002 | Qureshi et al. |
| 6,405,220 B1 | 6/2002 | Brodersen et al. |
| 6,405,221 B1 | 6/2002 | Levine et al. |
| 6,411,949 B1 | 6/2002 | Schaffer |
| 6,434,550 B1 | 8/2002 | Warner et al. |
| 6,434,563 B1 | 8/2002 | Pasquali et al. |
| 6,446,089 B1 | 9/2002 | Brodersen et al. |
| 6,463,460 B1 | 10/2002 | Simonoff |
| 6,535,882 B2 | 3/2003 | Pasquali |
| 6,535,909 B1 | 3/2003 | Rust |
| 6,571,295 B1 | 3/2003 | Sidana |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,605,120 B1 | 8/2003 | Fields et al. |
| 6,609,150 B2 | 8/2003 | Lee et al. |
| 6,621,834 B1 | 9/2003 | Scherpbier et al. |
| 6,636,856 B2 | 10/2003 | Pasquali |
| 6,654,032 B1 | 11/2003 | Zhu et al. |
| 6,658,419 B2 | 12/2003 | Pasquali |
| 6,665,648 B2 | 12/2003 | Brodersen et al. |
| 6,665,655 B1 | 12/2003 | Warner et al. |
| 6,684,218 B1 | 1/2004 | Santos et al. |
| 6,684,438 B2 | 2/2004 | Brodersen et al. |
| 6,687,878 B1 | 2/2004 | Eintracht et al. |
| 6,697,838 B1 | 2/2004 | Jakobsen |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,859,909 B1 | 2/2005 | Lerner et al. |
| 6,877,137 B1 | 4/2005 | Rivette et al. |
| 6,907,566 B1 | 6/2005 | McElfresh et al. |
| 6,944,821 B1 | 9/2005 | Bates et al. |
| 6,959,424 B1 | 10/2005 | Gardner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,100,195 B1 | 8/2006 | Underwood |
| 7,103,838 B1 | 9/2006 | Krishnamurthy et al. |
| 7,181,758 B1 | 2/2007 | Chan |
| 7,228,496 B2 | 6/2007 | Hamada |
| 7,243,301 B2 | 7/2007 | Bargeron et al. |
| 7,269,590 B2 | 9/2007 | Hull et al. |
| 7,289,976 B2 | 10/2007 | Kihneman et al. |
| 7,340,411 B2 | 3/2008 | Cook |
| 7,349,967 B2 | 3/2008 | Wang |
| 7,356,482 B2 | 4/2008 | Frankland et al. |
| 7,360,166 B1 | 4/2008 | Krzanowski |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,758 B1 | 3/2009 | Kekki |
| 7,508,789 B2 | 3/2009 | Chan |
| 7,536,417 B2 * | 5/2009 | Walsh ............... G06F 17/30861 |
| 7,562,287 B1 | 7/2009 | Goldstein et al. |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,606,865 B2 | 10/2009 | Kumar et al. |
| 7,620,655 B2 | 11/2009 | Larsson et al. |
| 7,620,996 B2 | 11/2009 | Torres et al. |
| 7,644,122 B2 | 1/2010 | Weyer et al. |
| 7,668,861 B2 | 2/2010 | Steven |
| 7,698,160 B2 | 4/2010 | Beaven et al. |
| 7,711,795 B2 | 5/2010 | Getsin et al. |

(56) References Cited

U.S. PATENT DOCUMENTS

| | | |
|---|---|---|
| 7,730,478 B2 | 6/2010 | Weissman |
| 7,747,648 B1 | 6/2010 | Kraft et al. |
| 7,752,237 B2 | 7/2010 | Ray |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,934,152 B2 | 4/2011 | Krishnamurthy et al. |
| 7,945,653 B2 | 5/2011 | Zukerberg et al. |
| 8,005,832 B2* | 8/2011 | Andrieu ............ G06F 17/30864 707/706 |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,293 B1* | 12/2011 | Doyle ................... G06F 9/5027 345/419 |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,255,819 B2 | 8/2012 | Chang et al. |
| 8,275,836 B2 | 9/2012 | Beaven et al. |
| 8,375,305 B1 | 2/2013 | Strand |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,595,635 B2 | 11/2013 | Krzanowski et al. |
| 8,646,103 B2 | 2/2014 | Jakobson et al. |
| 8,666,961 B1 | 3/2014 | Qureshi et al. |
| 9,430,583 B1 | 8/2016 | Flake |
| 9,753,926 B2 | 9/2017 | Flake et al. |
| 2001/0021935 A1 | 9/2001 | Mills |
| 2001/0044791 A1 | 11/2001 | Richter et al. |
| 2002/0032693 A1 | 3/2002 | Chiou et al. |
| 2002/0032740 A1 | 3/2002 | Stern et al. |
| 2002/0072951 A1 | 6/2002 | Lee et al. |
| 2002/0078050 A1 | 6/2002 | Gilmour |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0198758 A1 | 12/2002 | Sawa et al. |
| 2003/0004971 A1 | 1/2003 | Gong |
| 2003/0018705 A1 | 1/2003 | Chen et al. |
| 2003/0018830 A1 | 1/2003 | Chen et al. |
| 2003/0048286 A1 | 3/2003 | Lal |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0081000 A1 | 5/2003 | Watanabe |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0204490 A1 | 10/2003 | Kasriel |
| 2003/0206192 A1 | 11/2003 | Chen et al. |
| 2003/0212666 A1 | 11/2003 | Basu et al. |
| 2003/0221167 A1 | 11/2003 | Goldstein et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0014013 A1 | 1/2004 | Diesel et al. |
| 2004/0015981 A1 | 1/2004 | Coker et al. |
| 2004/0027388 A1 | 2/2004 | Berg et al. |
| 2004/0021686 A1 | 5/2004 | Barberis |
| 2004/0128001 A1 | 7/2004 | Levin et al. |
| 2004/0138946 A1 | 7/2004 | Stolze |
| 2004/0186817 A1 | 9/2004 | Thames et al. |
| 2004/0186860 A1 | 9/2004 | Lee et al. |
| 2004/0187082 A1 | 9/2004 | Hathaway |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0022115 A1 | 1/2005 | Baumgartner et al. |
| 2005/0050555 A1 | 3/2005 | Exley et al. |
| 2005/0091098 A1 | 4/2005 | Brodersen et al. |
| 2005/0216421 A1 | 9/2005 | Barry et al. |
| 2006/0004703 A1 | 1/2006 | Spivack et al. |
| 2006/0116994 A1 | 6/2006 | Jonker et al. |
| 2006/0173985 A1 | 8/2006 | Moore |
| 2006/0242306 A1 | 10/2006 | Boro et al. |
| 2007/0067338 A1 | 3/2007 | Koizumi et al. |
| 2007/0067710 A1 | 3/2007 | Clark et al. |
| 2007/0128899 A1 | 6/2007 | Mayer |
| 2007/0156777 A1 | 7/2007 | Wolff et al. |
| 2007/0203945 A1 | 8/2007 | Louw |
| 2007/0250405 A1 | 10/2007 | Ronen et al. |
| 2007/0266342 A1 | 11/2007 | Chang et al. |
| 2008/0022229 A1* | 1/2008 | Bhumkar .......... G06F 17/30899 715/838 |
| 2008/0055263 A1* | 3/2008 | Lemay .............. H04M 1/72522 345/173 |
| 2008/0065514 A1 | 3/2008 | Eaton |
| 2008/0168345 A1 | 7/2008 | Becker |
| 2008/0177994 A1 | 7/2008 | Mayer |
| 2008/0184138 A1 | 7/2008 | Krzanowski et al. |
| 2008/0243910 A1 | 10/2008 | Meadows |
| 2008/0249972 A1 | 10/2008 | Dillon |
| 2008/0307301 A1 | 12/2008 | Decker et al. |
| 2009/0047000 A1 | 2/2009 | Walikis et al. |
| 2009/0063415 A1 | 3/2009 | Chatfield et al. |
| 2009/0083300 A1 | 3/2009 | Wake et al. |
| 2009/0100342 A1 | 4/2009 | Jakobson |
| 2009/0113288 A1 | 4/2009 | Thampy et al. |
| 2009/0177744 A1 | 7/2009 | Marlow et al. |
| 2009/0210780 A1 | 8/2009 | Oshima |
| 2010/0083095 A1 | 4/2010 | Nikovski et al. |
| 2010/0281364 A1 | 11/2010 | Sidman |
| 2011/0055285 A1 | 3/2011 | Chenthamarakshan et al. |
| 2011/0218958 A1 | 9/2011 | Warshavsky et al. |
| 2011/0247051 A1 | 10/2011 | Bulumulla et al. |
| 2012/0005429 A1 | 1/2012 | Kalasapur et al. |
| 2012/0042218 A1 | 2/2012 | Cinarkaya et al. |
| 2012/0204101 A1 | 8/2012 | Yoshida |
| 2012/0216107 A1 | 8/2012 | Iwabuchi |
| 2012/0233137 A1 | 9/2012 | Jakobson et al. |
| 2012/0290407 A1 | 11/2012 | Hubbard et al. |
| 2012/0297286 A1 | 11/2012 | Nagahama et al. |
| 2013/0073944 A1 | 3/2013 | Motgi et al. |
| 2013/0124684 A1 | 5/2013 | Zheng et al. |
| 2013/0155463 A1 | 6/2013 | Jin et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0290828 A1 | 10/2013 | Flake et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |

(56) References Cited

U.S. PATENT DOCUMENTS

2015/0142596 A1 5/2015 Jakobson et al.
2015/0172563 A1 6/2015 Jakobson et al.
2016/0292294 A1 10/2016 Flake

OTHER PUBLICATIONS

Sarawagi et al., "Learning to Extract Information From Large Domain-Specific Websites" ACM SIGKDD Explorations Newsletter, vol. 6, Issue 2, Dec. 2004, pp. 61-66.
Netscape Communicator 4.75 (NETSCAPE) copyright 2000, pp. 1-18.
Homer et al. Instant HTML, copyright 1997, p. 139.
MicroSoft Word 2000 (Microsoft Word), copyright 1999, pp. 1-4.
Netscape Navigator 3.01 (NETSCAPE 3.01), copyright 1996, pp. 1-3.
Using an Octopus to Drive Non-Members to Your Reviews; Epinions.com, Nov. 28, 2000.
NAR's Web Intelligence Summary—No. 11; Realtor.org, Jul. 2000.
Better Ways to Browse the Web; Harry McCracken, PCWorld.com, Oct. 27, 2000.
Octopus Revamps Web Customization Service; Tom Spring, PCWorld.com, Jul. 7, 2000.
Octopus.com Partners With Content Providers; Writenews.com, Aug. 9, 2000.
Octopus CEO Steve Douty. (Company Business and Marketing); Kathryn O'Brien, Internet World, Apr. 1, 2001.
Content Goes to Pieces. (Company Business and Marketing); James C. Luh, Internet World, Jul. 1, 2000.
Capturing Images in Netscape Communicator, http://www.intemet4classrooms.com/netscape_images.htm, Apr. 15, 2001, pp. 1-3.
Composing and editing Webpages—An overview of Composer and its features, http:l/wp.netscape.com/eng/mozilla/4.0/handbook/comp.htm, Aug. 9, 2000, pp. 3-6 and 24-27.
Netscape Help—My Netscape, May 2, 2001, http://help.netscape.com/mynetscape/faq.html, pp. 1-6.
U.S. Office Action dated Nov. 12, 2010 for U.S. Appl. No. 12/020,170.
U.S. Final Office Action dated May 24, 2011 for U.S. Appl. No. 12/020,170.
U.S. Office Action dated Sep. 28, 2011 for U.S. Appl. No. 12/020,170.
U.S. Office Action dated May 8, 2012 for U.S. Appl. No. 12/020,170.
U.S. Final Office Action dated Oct. 1, 2012 for U.S. Appl. No. 12/020,170.
U.S. Office Action dated Nov. 9, 2012 for U.S. Appl. No. 12/020,170.
U.S. Final Office Action dated May 14, 2013 for U.S. Appl. No. 12/020,170.
Notice of Allowance for U.S. Appl. No. 12/020,170 dated Sep. 23, 2013.
U.S. Office Action [letter restarting period for response] dated Oct. 24, 2011 issued in U.S. Appl. No. 12/020,170.
U.S. Office Action dated Jan. 20, 2015 issued in U.S. Appl. No. 13/460,632.
U.S. Final Office Action dated Aug. 24, 2015 issued in U.S. Appl. No. 13/460,632.
U.S. Office Action dated Mar. 30, 2016 issued in U.S. Appl. No. 13/460,632.
U.S. Final Office Action dated Oct. 7, 2016 issued in U.S. Appl. No. 13/460,632.
U.S. Office Action dated Jan. 10, 2013 issued in U.S. Appl. No. 13/158,343.
U.S. Final Office Action dated Sep. 9, 2013 issued in U.S. Appl. No. 13/158,343.
U.S. Office Action dated Apr. 11, 2014 issued in U.S. Appl. No. 13/158,343.
U.S. Final Office Action dated Jun. 10, 2015 issued in U.S. Appl. No. 13/158,343.
U.S. Office Action dated Sep. 28, 2015 issued in U.S. Appl. No. 13/158,343.
U.S. Notice of Allowance dated Feb. 29, 2016 issued in U.S. Appl. No. 13/158,343.
U.S. Notice of Allowance dated Feb. 15, 2017 issued in U.S. Appl. No. 13/460,632.
U.S. Notice of Allowance dated May 18, 2017 issued in U.S. Appl. No. 13/460,632.
Microsoft, "Control the formatting when you paste text", *Office Support*, [Retrieved on Mar. 17, 2014, from the Internet <URL: http://office.microsoft.com/en-us/word-help/control-the-formatting-when-you-paste-text-HA010215708.aspx>], 4pp.
U.S. Appl. No. 15/667,944, filed Aug. 3, 2017, Flake et al.

* cited by examiner

FIG. 23
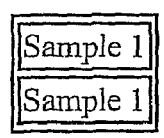
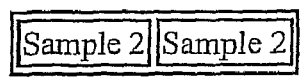
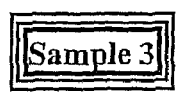
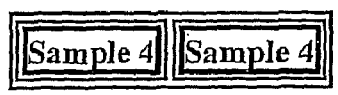

SYSTEM, METHOD AND APPARATUS FOR SELECTING CONTENT FROM WEB SOURCES AND POSTING CONTENT TO WEB LOGS

RELATED APPLICATIONS

This application claims priority to co-pending and commonly assigned U.S. patent application Ser. No. 12/020,170, titled "System, Method and Apparatus for Selecting Content From Web Sources and Posting Content to Web Logs", by Krzanowski, et al., filed on Jan. 25, 2008, which claims priority to U.S. Provisional Patent Application No. 60/897,449, titled "System, Method and Apparatus for Selecting Content From Web Sources and Posting Content to Web Logs", by Krzanowski, et al., filed on Jan. 25, 2007, both of which are hereby incorporated by reference in their entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention pertains in general to the World Wide Web, and more particularly to a method, system and apparatus for selecting, displaying, managing, tracking and transferring access to content accessible by computing devices on the World Wide Web and other sources.

BACKGROUND OF THE INVENTION

Interconnected computer systems, such as those interconnected by the Internet, and the like, provide fast and convenient means for obtaining information from various sources throughout the world, and for sharing the information with others. In the world of the Internet, one of the forms of this information is the web page.

An Internet web page can contain a large amount of information and a large number of individual items, such as text, photographs, moving images and the like. The present invention enables Users to quickly and conveniently focus on and display separately selected items of content of a web page, and to share those selected items with other individuals or systems over the network.

The World Wide Web uses a growing variety of media, styles and elements arranged in the form of web pages. These web pages contain various types of content, including text, pictures and other compelling visual formats. As a rule, web pages have a finite amount of usable space in which to place text, images, and other content. Because of this, the authors of the web pages must make compromises in regards to how much space is reserved for textual information, and how much for the other visual aspects (images, animation, video, etc). An analogy can be made to a newspaper. Each section of the paper is provided its own 'space' on the paper itself, with boundaries defining where topics, stories and pictures appear. Since a web page also follows many of these same layout restrictions, elements within a web page are typically restricted to given areas on the page.

One notable difference between the pages of printed matter and the pages of a web site lies in the digital format of the web page. The web page can be dynamic and changeable, whereas the printed pages are fixed and unchanging. But because web pages share much of their layout characteristics with the printed page, even the digital format must obey the space restrictions placed upon it. This is what determines how much space a picture or image gets, in comparison to the text on a page. Text, be it on a printed page or web page, follows normal publishing rules regarding size, font, spacing and other factors affecting the page design. Images, pictures and other rich content, however, are restricted by the remaining limited space available on the page. There is, therefore, a need for a method, system and apparatus that allows users to display selected content from web pages and other sources in separate, scalable, and re-sizeable windows.

Often, as users view web pages, they find that they have no easy or practical way to simultaneously view content from two different web pages or web sites. Some of the methods that have been devised to overcome this limitation include launching multiple instances of a web browser, or opening a link in a new window (both launch a new full instance of the browser). This allows users to try to resize the content within each page or browser instance, and fit both on the screen together. Most browsers will resize, but the contents within the page often will not. Additionally, by opening another fully enabled browser instance, users consume more memory resources than one browser instance would consume. By opening a link in a new window (if permitted), users are still running another full browser instance, and downloading that whole page in its entirety, regardless of which part of the page interests them, wasting time and bandwidth. Most web browsers (and web sites) display one web page at a time. To display more than one page, additional browser instances would be opened. There is, therefore, a need for a method, system and apparatus that allows users to simultaneously display selected content from different web pages in a manner that does not require the user to launch multiple fully-enabled browsers.

If a user wants to share web page content with others, the current and easiest existing method is to E-mail a 'link' to that content. The user would simply copy the URL in the address bar of their browser and paste it into an E-mail message. Another method that is considerably faster is that of Instant Messaging. Online, the user would copy and paste the URL of the shared web page in real-time. This has significant speed advantages, and allows for an almost 'virtual meeting' to take place. Unfortunately, the web pages do not always indicate the URL for the web page a user is viewing. This makes it difficult, if not impossible for the user to 'share' the location of this web page with another user. Another problem is caused by dynamic, form driven pages. These pages may have a number of drop-down lists from which the user could choose, or blank fields that might require user input. Because the URL for the resulting page may not be visible to the end user, it is difficult for a user show another user selected content. Much time is wasted by users having to 'walk' the other user through the entire web site in order for them to see the same results on their browser. There is, therefore, a need for a method and system that allows users to 'share' selected visual content from web pages with other users. There is also, therefore, a need for a method, system and apparatus that allows users to share only selected content from web pages in a manner that saves time and reduces bandwidth use.

SUMMARY OF THE INVENTION

The invention provides a system, method and apparatus for posting to web logs content accessible by computing devices, such as content in web pages, pop-up windows, players and plug-ins available on the World Wide Web, word processor documents, spreadsheets, and other like content. The selected content can be in the form of plain text, or can be in the faun of static or dynamic graphic images, such as pictures, movies, animations, web casts, "3-D" images, or the like. Further, using the system, the User can select and post several different content items, of the same type or of different types, and place all of the items in an independent browser window.

Importantly, the posted content (or placed in the independent browser window) only contains the content items selected by the User, and does not contain other content which may be present in the original source of the content. For example, a User may wish to select a specific image or string of text from a web page containing several images or a lengthy text section. Thus, the system allows the User to create an independent window with only the desired content item, free from other content items on the source, which permits the User to focus on the desired content item. Thus, the system provides a heretofore unavailable ability for a User to create a grouping, or custom selection of content available from the World Wide Web or other sources and post the selection to a web log.

The system also provides the ability to adjust both the size of the entire independent browser window, and, separately, the size of each content item within the window. Other important capabilities of the system include the ability to easily search for content similar to the selected content and the ability to transfer access to the custom selection to others via electronic mail, instant messenger applications, and other electronic communications methods.

The invention is effected, in part, by software added to the User's computing device, which is preferably in the form of a plug-in to an Internet browser, such as the Internet Explorer™ Internet browser of Microsoft Corporation or the Netscape Navigator™ Internet browser of Netscape Corporation, or similar content viewing applications. The software on the User's computing device modifies the User's browser to allow the User to select and post desired content from a web page or other document or spreadsheet, or the like, and optionally to place the desired content in an independent browser window, free from other content on the source web page or document. To access functions provided by the software, the software creates a toolbar on the browser, the Main Toolbar, having menu items or icons which activate the functions.

In a preferred form, the software allows the User to select desired content from a web page by directing the mouse pointer over the content, depressing the right mouse button (i.e., "right click") and choosing a Select Content Function offered in an otherwise standard pop-up menu. (In the drawings included herewith, the Select Content Function on such pop-up menu is identified by the word "Amplify"™). In the case of a text selection, the User preferably first defines the desired text by using the standard "click and drag" method and then the "right click" method. Alternatively, the system may allow the user to highlight selected content items with borders and/or overlays.

For some types of content, such as media content, the system may place a floating icon over the content when the mouse is directed over the content. The floating icon can be used (clicked on) to select the content item with one click. Preferably, the floating icon appears as an overlay on top of the content item and only appears when the User directs the mouse pointer over the content item. Thus, the floating icon does not ordinarily obscure the content item.

After the User selects the content, the software may present the User with a Properties Window that allows the User to enter a descriptive Description for the Custom selection being created by the User, and allows the User to enter Keywords for the custom selection. As described in detail below, the software uses the Keywords to perform searches for similar content on the World Wide Web.

Next, the software creates an independent browser window, the Custom Selection Window, containing only a relatively small toolbar, the Window Toolbar, and the custom selection of the content items selected by the User. This allows the User to select and focus on desired content free from additional, and possibly distracting, content on the source page.

Certain content available on the World Wide Web, such as movies, animations and web casts, 3-D images and the like, may require that additional software be present on the User's computer. Such additional software includes media players such as Microsoft's Windows Medial Player, Real Media's Real Player, Apple's Quicktime, and other similar media players, and includes other "applets", plug-ins, applications and programs. The User would need to install this software prior to using the system of the invention for these types of content.

The system also provides the ability for the User to save a Custom Selection Window for later viewing. One mode of this feature creates a Most Recently Used (MRU) list, or History, which saves a predetermined number (e.g., 20) of the last saved custom selections, in chronological order of use. Another mode of this feature, the Send to Favorites function, creates a semi-permanent list of Favorites. Preferably, the Main Toolbar, accessible on the main browser, includes a retrieval function, the GoTo Favorites function, accessible via a menu item or icon. When selected, the GoTo Favorites function displays a list of saved Custom Selection Windows, which are identified by the Description entered by the User when creating the Custom Selection Window. Thus, once a Custom Selection Window is sent to Favorites, the User can quickly and conveniently recreate the window at a later time by choosing the selection from the list of Favorites. The system also provides a convenient means for the User to print the Custom Selection Window. The Send To Printer function is preferably made available via a menu item or icon on the Window Toolbar.

The software is preferably compatible with several different computing platforms, such as Microsoft Windows-based and Apple computers, internet appliances, personal digital assistants (PDAs, such as the Palm Pilot, and the like), and other computing platforms, such that custom selections can be shared among Users of various computing devices. Further, certain items of User-defined attribute information, such as the User's Favorites and the Friends List, are preferably portable amongst various computing devices of the User. The software accomplishes this function by transmitting the attribute information to the Server and storing the information along with the unique User Identifier. The User's attribute information is retrieved using the User Identifier when the User first launches the browser. Thus, the system provides a consistent and familiar experience regardless of which computing device the User chooses.

The user can post to web logs selected content items (including previously saved selections of content items) by providing the access credentials and network location (e.g., url) of the web log to the system, and then directing the system to post the selection to the web log. The user can do so without leaving the web site from which the content is selected. Therefore, the system provides a convenient and effective method to add content items to one's web log.

It can be appreciated that the present invention provides a convenient method for a User to create, view, modify, print and save custom groupings of image and text content items available on web pages and other sources, to search for other related content, and to transfer access to such selections with others, which method is effected in a manner which avoids the limitations of electronic communications methods, which reduces the time and bandwidth required to share the custom groupings via electronic messages, and which provides for highly accurate and flexible tracking of such content viewing and sharing.

BRIEF DESCRIPTION OF THE DRAWINGS

For a complete understanding of the above and other features of the invention, reference shall be made to the following detailed description of the preferred embodiments of the invention and to the accompanying drawings, wherein:

FIG. 23 is an image of a sample web page defined by the source code in Table AE;

DETAILED DESCRIPTION OF THE INVENTION

Figure 1:
FIG. 1 is an image of an Internet browser application showing the Main Toolbar of the present invention.

Referring to FIG. 1, to employ the present invention, the User installs software on the User's computing device that adds functionality to the Internet browser application and operating system of the User's computing device. Upon installation of the software, the software communicates with a remote Server that assigns a unique User Identifier for the User and transmits the User Identifier to the User's computing device, which stores the User Identifier on a memory device for later use.

Selecting Content Items

The software adds a Main Toolbar 10 to the browser application 12 on the User's computing device to allow the User to create a custom selection by selecting desired content items from a web page or other document or spreadsheet, or the like, and to place the desired content items in an independent browser window, free from other content on the source web page or document. As discussed in detail below, the Main Toolbar 10 has menu items or icons that activate some of the functions.

By default, the software may analyze web pages and other types of sources upon loading into the browser application to identify content items supported by the software and to determine the network locations of the content items. A list of supported content is preferably contained in a file stored on the User's computing device, such as in a Dynamic Link Library (DLL), that can be updated automatically as new types of content become supported by the software. The Main Toolbar 10 preferably provides a menu item that allows the User to disable the automatic page scanning if desired.

Figure 2:
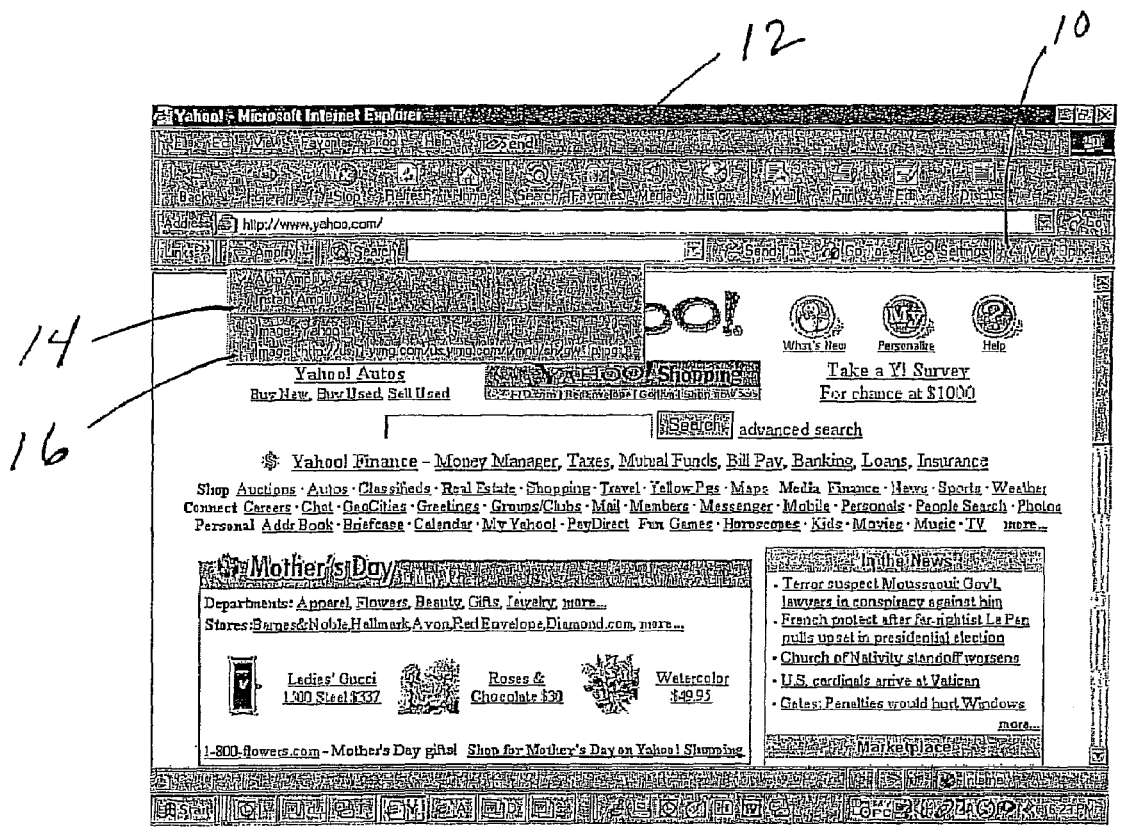
FIG. 2 is an image of the Main Toolbar showing the Identified Content Item List.

Referring to FIG. 2, the Main Toolbar 10 includes an Identified Content 14 menu item that displays an Identified Content Items List 16 of supported and identified content items in the web page or source currently loaded into the browser application. The User can select a desired content item by clicking on the item in the Identified Content Items List 16.

Figure 3:
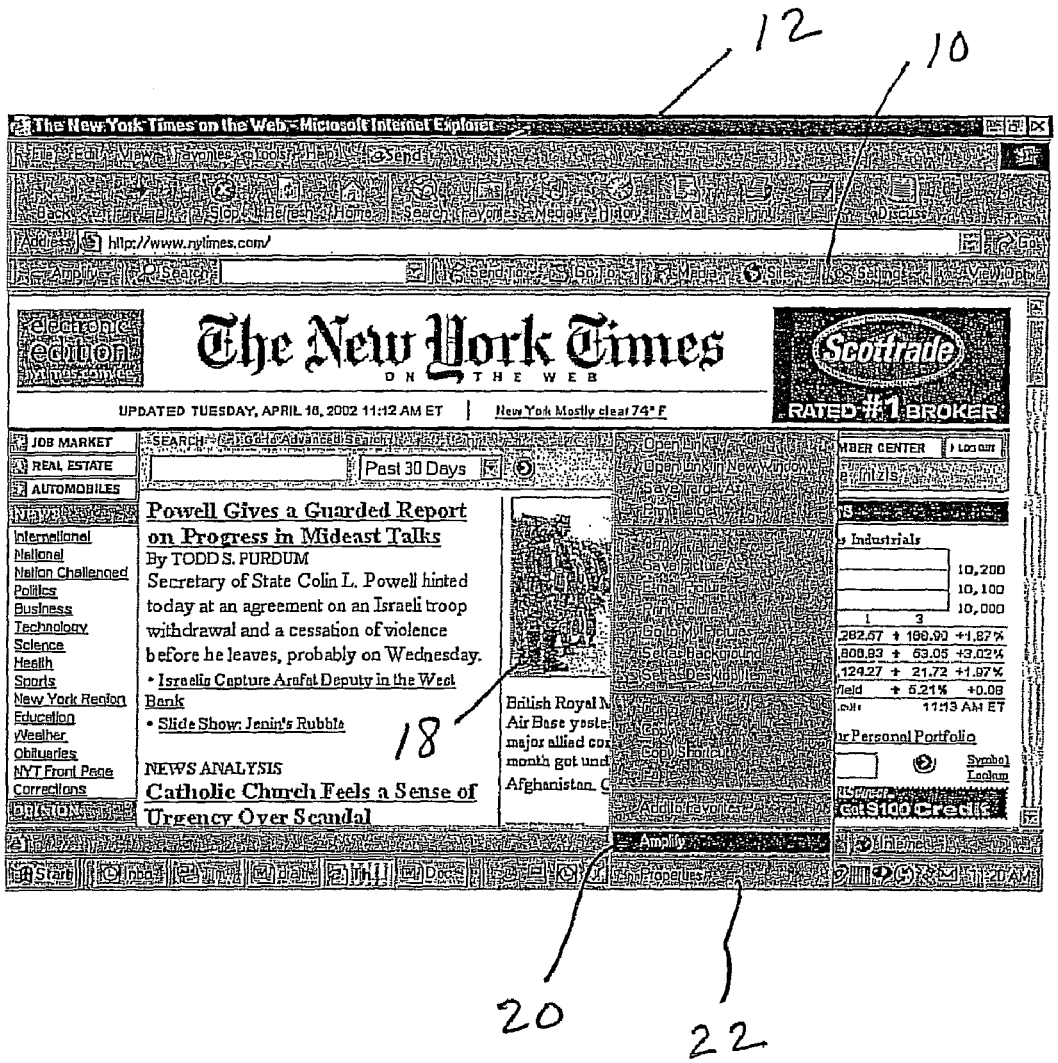
FIG. 3 is an image of the Select Content Item Function invoked by the "right-click" method of selecting a content item.

Referring to FIG. 3, the User can also select a desired content item from a web page by directing a pointing device of the computing device (e.g., a mouse pointer) over the content item 18 in the page, depressing the right mouse button (i.e., "right click") and choosing a Select Content Item Function 20 offered in an otherwise standard pop-up menu 22. (In the drawings included herewith, the Select Content Item Function 20 on such pop-up menu 22 is identified by the word "Amplify"™).

It should be noted that, when selecting content items, the software obtains the network location and name of the content item from the web page or other source of the content item and retains the network location in memory, which is preferably temporary memory. Specifically, the system obtains and retains the complete network location of the content item whether the content item is defined in the source code of the document (e.g., web page) by an absolute uniform resource locator (url) or by a relative url. Further, it should be noted that content items (and groups of content items) can be selected using the standard "click and drag" method and then the "right click" method.

In the case of a content item that is text, the User preferably first defines the desired text by using the standard "click and drag" method and then the "right click" method. This function is also operable to select non-text content items. A group of non-text content items or a group of text and non-text content items may be selected in a similar manner by selecting the entire group, for example using the "click and drag" method. Preferably, a select function inherent in the operating system (e.g., Windows™) is employed to obtain HTML coding or other formatting instructions for the text and/or non-text content items. It should be noted that, as used herein, the term "click" is meant to encompass any means or method by which the pointing device receives a selection command from the User.

Figure 4:
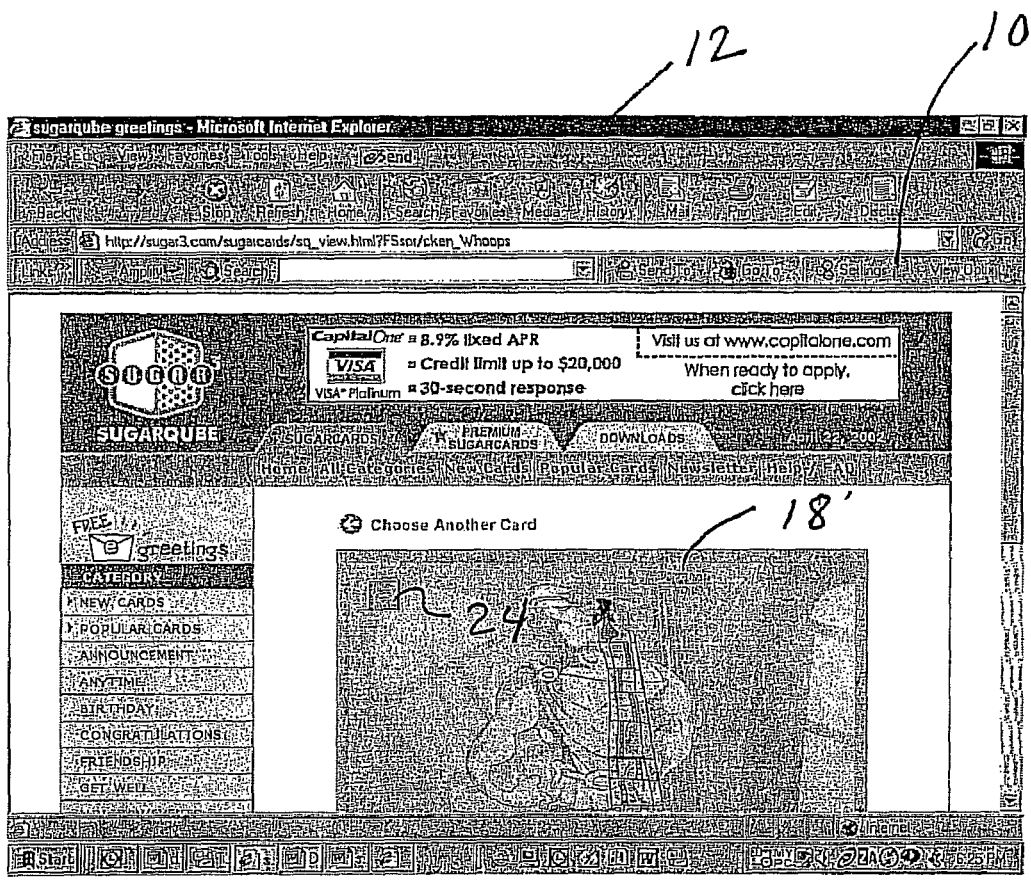
FIG. 4 is an image illustrating the floating Instant Selection Icon.

Referring to FIG. 4, for some types of content, such as media content, the system preferably places a floating, Instant Selection Icon 24 over the content item 18' when the User directs the mouse pointer over the display area or frame of the content item. The Instant Selection Icon 24 can be used (clicked on) to select the content item 18' with one click. Preferably, the Instant Selection Icon 24 appears as an overlay on top of the content item 18' and only appears when the User directs the mouse pointer over the display area or frame of the content item. Thus, the Instant Selection Icon 24 does not ordinarily obscure the content item.

Window Description and Keywords

Figure 5:
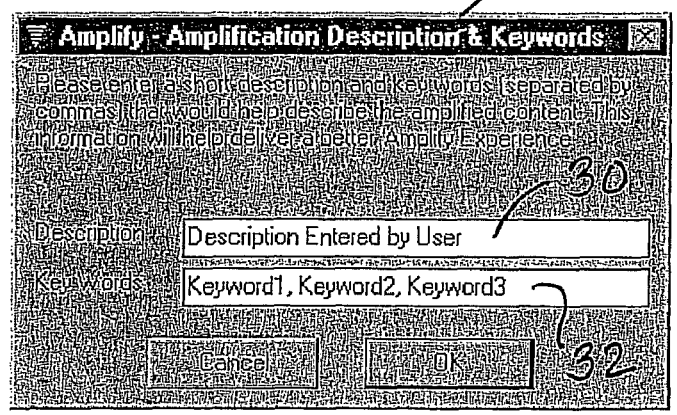
FIG. 5 is an image of the Properties Window.

Referring to FIG. 5, after the User selects the content item, the software may present a Properties Window 28 that allows the User to enter a Description 30 for the custom selection being created by the User, and allows the User to enter Keywords 32 for the custom selection. As described in detail below, the software uses the Keywords 32 to perform searches for similar content on the World Wide Web.

The Custom Selection Window

Figure 6:
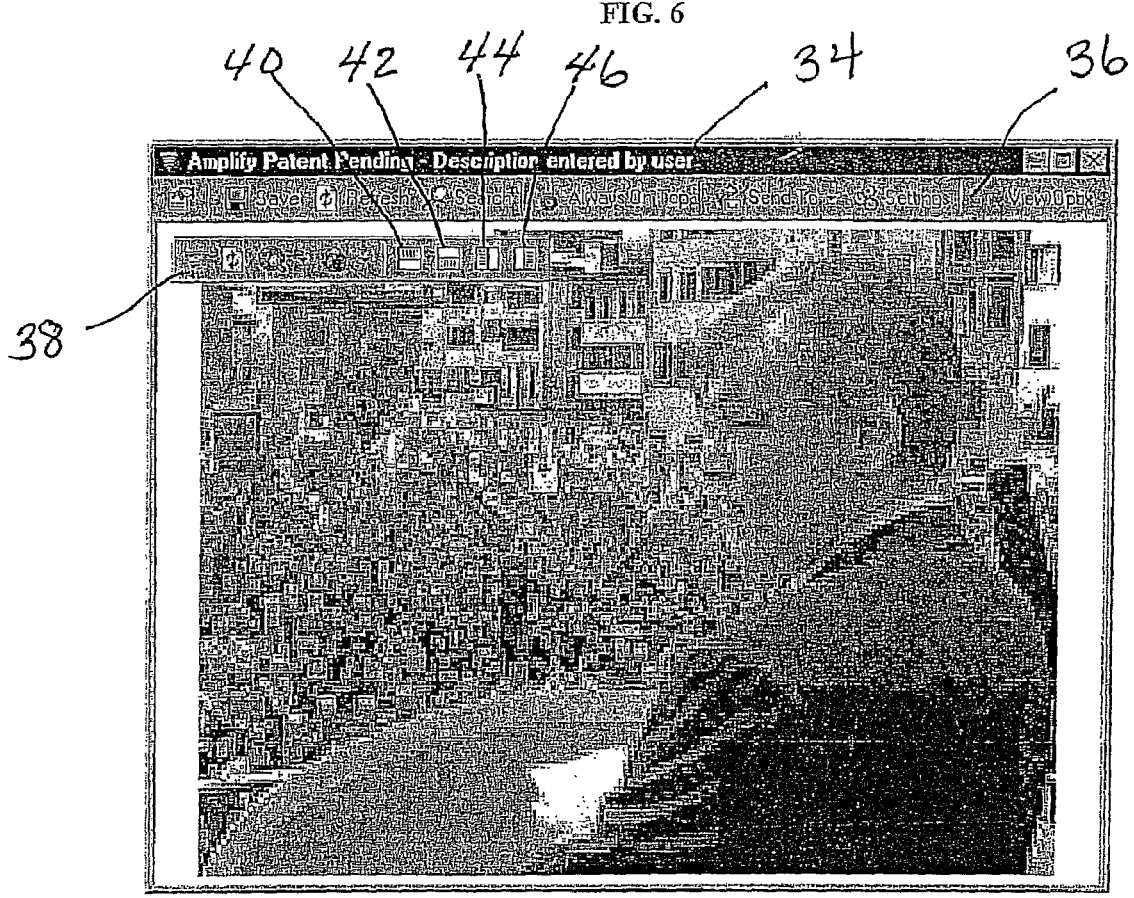
FIG. 6 is an image of a Custom Selection Window having a single image content item.

Referring to FIG. 6, the software then creates an independent browser window, the Custom Selection Window 34, containing only a relatively small toolbar, the Window Toolbar 36, and the custom selection of the content item 18 selected by the User. This allows the User to select and focus on desired content free from additional, and possibly distracting, content on the source page. The network location of the content item is retrieved from the (temporary) memory to which it was stored during the selection process.

The software preferably loads the content item into the Custom Selection Window 34 directly from the original (network) source of the content item identified during the selection process. It is intended that the teen network source as used herein include any cached source that may be present on the network.

Preferably, the Custom Selection Window 34 is of a predetermined size and may be resized by the User in the known manner of resizing windows. Also, preferably, the content item 18 selected by the User is set to occupy specific percentages of the height and width of the window (other than the Window Toolbar 36), such as 100%. Thus, when the User adjusts the height or width (or both) of the Custom Selection Window 34, the browser application adjusts the dimensions of the content item 18 within the window proportionately. However, the system preferably maintains any original aspect ratio settings of the content item.

Certain content available on the World Wide Web, such as movies, animations and web casts, 3-D images and the like, may require that additional software be present on the User's computer. Such additional software includes external player programs (such as Microsoft's Windows Medial Player, Real Media's Real Player, Apple's Quicktime, and other similar media players), helper application, "applets", plug-ins, and other programs. The User would need to install this software prior to using the system of the invention for these types of content.

The software allows the User to have several instances of the Custom Selection Window 34 open at any given time, each window containing a different custom selection. If additional software is required to view a content item in a Custom Selection Window 34, such as a media player or applet, or the like, the additional software is preferably defined within the Custom Selection Window as an "embedded object", which allows multiple instances of the additional software to operate on the computing device at the same time. In this manner, the User can select and view several content items requiring the same additional software at the same time.

Inserting Additional Content Items into a Custom Selection Window

Figure 7:
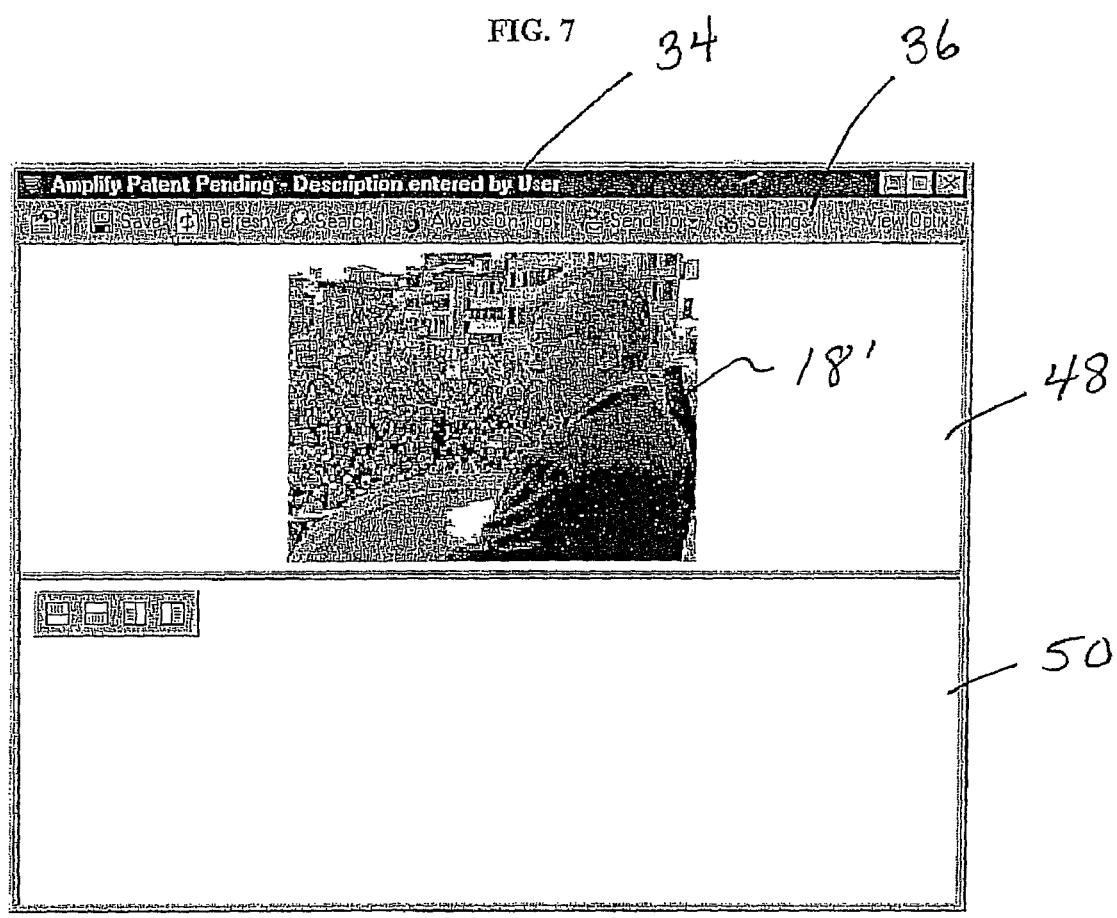
FIG. 7 is an image of a Custom Selection Window having a content item in a top frame and a blank bottom frame.

Referring to FIGS. 6 & 7, the software also allows the User to add additional content items to an existing Custom Selection Window 34. To do this, the User preferably first divides a Frame 37 of an existing content item 18 in the Custom Selection Window 34 to add a new frame to the window. The Frame Toolbar 38, which appears over the content item 18 in the Custom Selection Window 34, includes New Frame Bottom, New Frame Top, New Frame Right, and New Frame Left icons 40, 42, 44, 46 (or menu items) that add a new frame below, above, to the left or to the right, respectively, of the existing content item 18. The software preferably divides the frame 36 of the selected content item 18 into two, equal, sub-frames 48, 50, with one of the frames 48 occupied by the existing content item 18 and the other frame 50 blank. Then, the User selects an additional content item in the manner described above.

Figure 8:
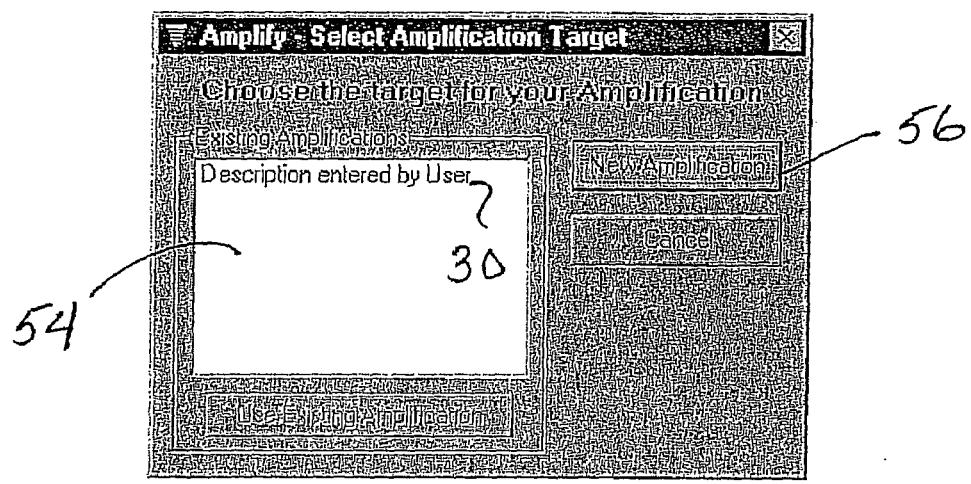
FIG. 8 is an image of the Select Target Window.

Referring to FIG. 8, upon the selection of an additional content item, the software determines whether there exist other, open Custom Selection Windows. If so, the software presents a Select Target Window 52, that displays an Open Window List 54 of all open Custom Selection Windows, which are preferably identified by the Description 30 entered by the User when creating the windows. Preferably, the User can select an open window from the Open Window List 54. The Select Target Window 52 also preferably provides a New Window 56 button, icon or menu item to allow the User to place the content item in its own Custom Selection Window, if desired.

Upon the selection of an open Custom Selection Window as the target, the software displays the selected Custom Selection Window 34, which includes the frame 48 occupied by the existing content item 18 and a blank frame 50 (as shown in FIG. 6). If the Custom Selection Window 34 contains more than one blank frame, the software then preferably pauses and prompts the User to select the blank frame in which to place the additional content item. The User can select the desired blank frame by clicking within the border of the frame. If the Custom Selection Window 34 contains only one blank frame then the software may automatically place the additional content item within that frame.

Figure 9:
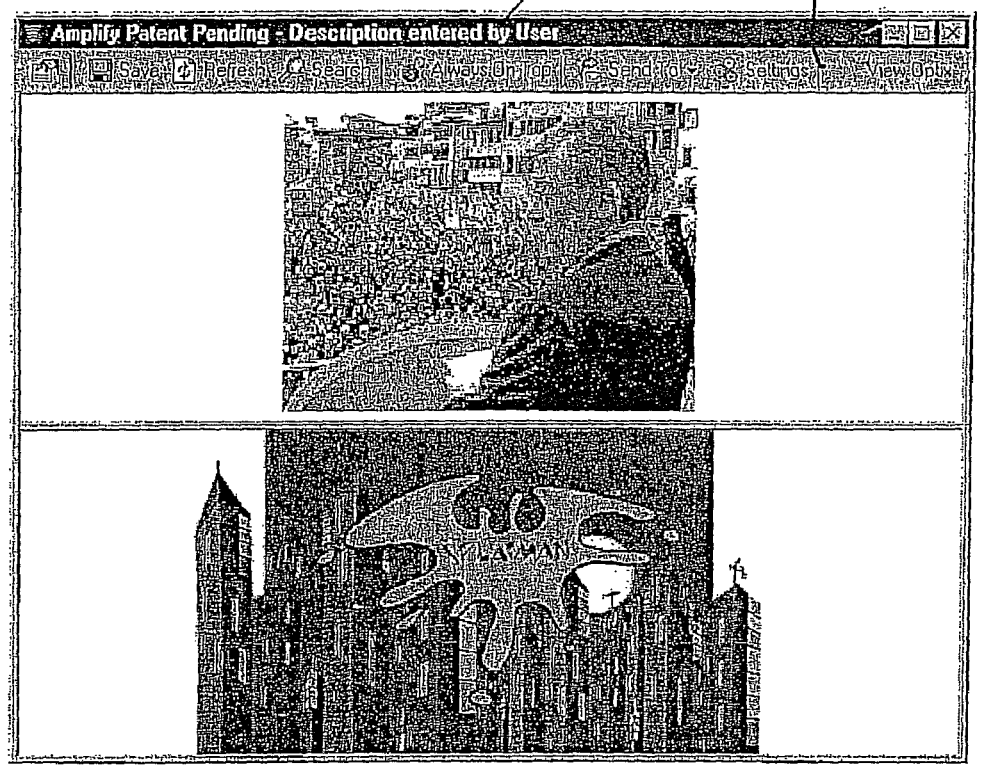
FIG. 9 is an image of a Custom Selection Window having an image content item in a top frame and an animation content item in a bottom frame.

Referring to FIG. 9, the software then displays the modified Custom Selection Window 34, which now contains both the first content item 18 (e.g., in the top frame 48) and the additional content item 58 (in the bottom frame 50).

Figure 10:
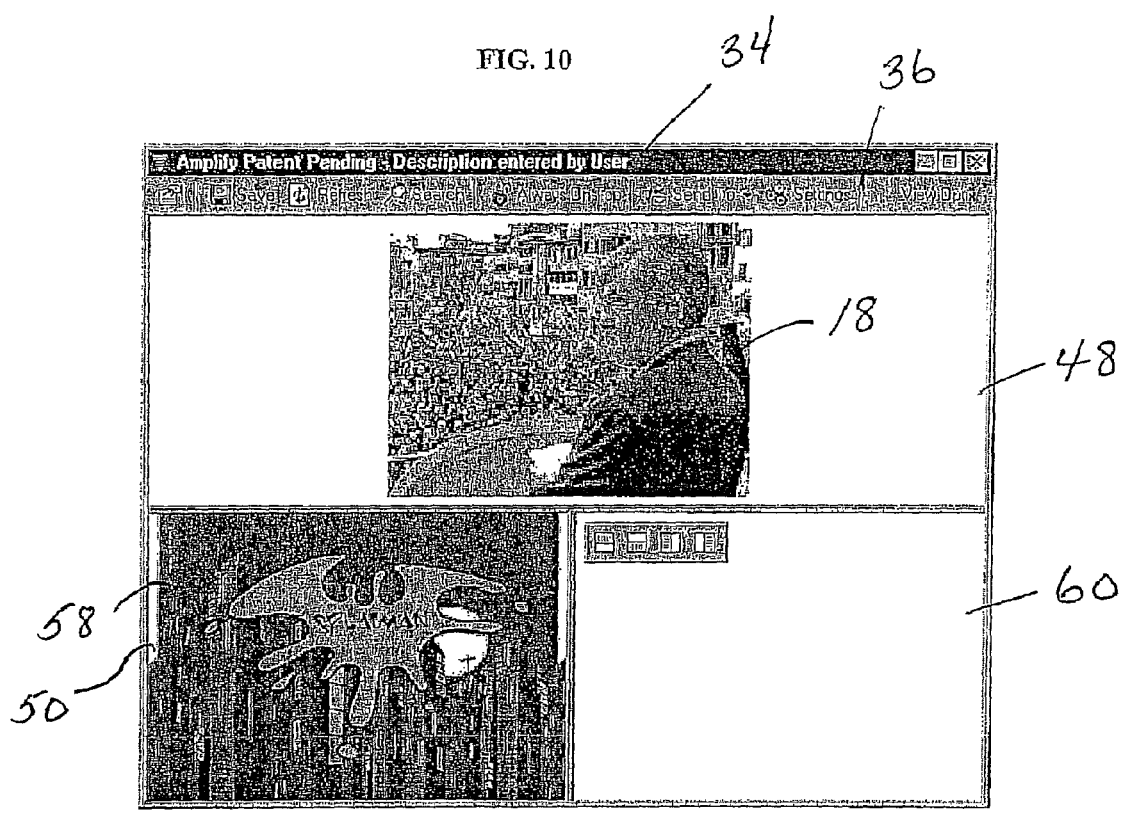
FIG. 10 is an image of a Custom Selection Window having a bottom frame divided into right and left frames.
Figure 11:
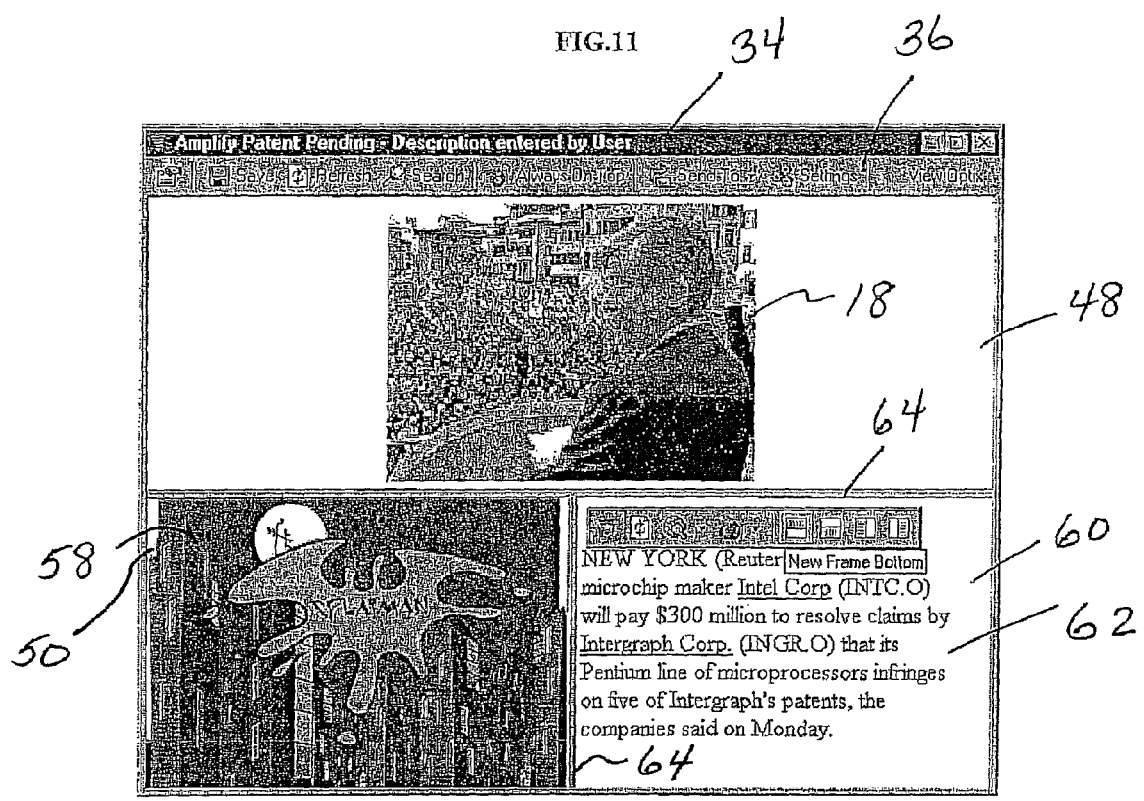
FIG. 11 is an image of a Custom Selection Window having an image content item in a top frame, having an animation content item in a left bottom frame and having a text content item in a right bottom frame.

Referring to FIGS. 10 & 11, the process can be repeated to populate the Custom Selection Window 34 with more content items. In this case, a new frame 60 is added to the right of the bottom frame 50. As above, the new frame 60 is added by selecting the New Frame Right icon 44 in the Frame Toolbar 38 (not shown) of the bottom frame 50 to add a frame to the right of the bottom frame 50. As shown, a text selection content item 62 can then be placed in the new frame 60 in the manner described above.

The software preferably defines the frames of the Custom Selection Window (in HTML) to collectively occupy specific percentages (e.g., 100%) of the height and width of the Custom Selection Window (not including the Window Toolbar 36). Further, as with a single content item, each of the several content items is preferably set to occupy specific percentages (e.g., 100%) of the height and width of its respective frame. The User may also preferably resize and rescale the frames in a Custom Selection Window by relocating a border between frames by clicking on and dragging a border 64 to a new location. When the frame border is relocated, the browser application resizes both of the content items within the frames that share that border 64, proportionately. However, the system preferably maintains any original aspect ratio settings of the content item. It can be appreciated that the ability to arrange, size and resize multiple content items within one independent browser page gives the User great flexibility when creating custom selections.

As a first step in creating the Custom Selection Window 34, the software first determines what type of content has been selected and determines whether there exists other open Custom Selection Windows. The software then defines certain parameters of the content item, such as the source page or document of the content item and the file name of the content item. Then, the software launches a new browser application window and passes the XML structure of the image to the new window.

Upon the creation of the new window, the software pauses to receive an indication from the User as to the desired location of the content item within the new window. As stated above, if there is only one possible (i.e., blank) frame for the content item, then the software may automatically insert the content item in that frame. The software again determines the type of the content item and calls an appropriate function to populate the target frame with the content item.

The XML structure of a content item preferably includes tags related to the network location and other aspects of the source of the content item such as the protocol (e.g., http), host (e.g., amplifytheweb.com), path (e.g., /images/), page (e.g., page.html), and query. For an image item, the XML structure also preferably includes tags related to the file name (e.g., image.jpeg), alternate information (e.g., "A JPEG image"), height and width.

The HTML code that defines the frameset for a Custom Selection Window preferably defines the frames as predetermined percentages of the window. The code may also identify the Custom Selection Window by a unique Window Identifier.

Save

A Save icon saves the Custom Selection Window 34 for later use. Preferably a Window Definition of the Custom Selection Window 34 is saved in memory of the computing device of the User (e.g., RAM or on a hard drive) and/or on a remote Server accessible via the Internet or other network. Preferably the content items of a Custom Selection Window are not themselves saved on the computing device of the User or on the Server, but only the Window Definition, which Window Definition contains the particulars of the Custom Selection Window and of the content items therein. Preferably, the Window Definition is in the form of an XML document containing a unique Window Identifier, a frameset and specific information for each frame.

Preferably, upon saving a new Window Definition, the software on the computing device of the User or the Server assigns a unique Window Identifier to the Custom Selection Window which is saved with or otherwise associated with the Window Definition. As discussed below, the Window Identifier is used to recreate the Custom Selection Window at a later time. For non-text content items, the Window Definition does not include the actual content items, but does include information regarding the source and identity of the content item sufficient to access or recreate the content item. Specifically, for non-text content items, the Window Definition preferably includes information identifying the source of the content item, including the domain name, path and file name, and includes identifying information and parameters of any media player or external application (or the like) required to display or play the content item. For text content items, the Window Definition may include the string of text selected by the User, or may include information identifying the source of the text and coordinates specifying the beginning and end points of the text. If entered by the User, the Window Definition also includes the Keywords 30. The example of the XML code set forth in Table S below is a Window Definition having a video content item, a text content item and an image content item.

TABLE S

```
<amplification>
    <guid>{7DAED7EF-FC90-4CF7-91C6-8886F5BF5C4F}</guid>
    <height>360</height>
    <width>643</width>
    <description>New Amplification</description>
    <keywords></keywords>
    <frameset>
        <frameset cols="50%,50%"><frameset rows="57%,43%"><frame id="fraAmplify3"/><frame id="fraAmplify1"/></frameset><frameset rows="30%,70%"><frame id="fraAmplify2"/><frame id="fraAmplify0"/></frameset></frameset></frameset><frames><frame id="fraAmplify0" type="HTMLObjectElement">
            <source>
                <protocol>http:</protocol>
                <host>www.msnbc.com</host>
```

TABLE S-continued

```
                <path>/m/mw/</path>
                vw.htm
                <query></query>
            </source>
            <object type="MEDIAPLAYER">
                <class-id>CLSID:22d6f312-b0f6-11d0-94ab-0080c74c7e95</class-id>
                <code-base>http://activex.microsoft.com/activex/controls/mplayer/en/nsmp2inf.cab#Version=6,4,7,1112</code-base>
                <standby>Loading Microsoft Media Player compnents...</standby>
                <params><param name="AnimationAtStart">False</param><param
name="AutoRewind">False</param><param name="baseUrl"></param><param
name="FileName">http://www.msnbc.com/m/mw/s/msnbc/asx.asp?er=http://www.msnbc.com/m/mw/s/msnbc/sorry.asf&b=&bu=&vu
=&pu=mms://od-msnbc.msnbc.com/msnbc/video/promo/100/promo3.asf&cu=mms://od-
msnbc.msnbc.com/msnbc/video/commercials/100/ad__intertainer__04.asf&akid=472002</param><param name="PlayCount">1</param><param
name="Rate">1</param></params>
            </object>
        </frame><frame id="fraAmplify1" type="IHTMLTxtRange">
            <source>
                <protocol>http:</protocol>
                <host>www.ncodev.com</host>
                <path>/</path>

<query></query>
            </source>
            <content>
                <![CDATA[<IMG height=10 src="images/dots.gif" width=4><B> NCODE</B> is the leading
software engineering firm to provide <I>integration services</I> and <I>custom
application development</I> merging legacy technologies and cutting edge
engineering tools to create the most powerful business applications. <BR>]]>
            </content>
        </frame><frame id="fraAmplify2" type="HTMLImg">
            <source>
                <protocol>http:</protocol>
                <host>www.ncodev.com</host>
                <path>/</path>

<query></query>
            </source>
            <image>
                <src>http://www.ncodev.com/images/phrase__2.gif</src>
                <alt></alt>
                <height>54</height>
                <width>232</width>
                <mime-type/>
                <scale>1</scale>
            </image>
        </frame><frame id="fraAmplify3" type="IHTMLTxtRange">
            <source>
                <protocol>http:</protocol>
                <host>www.ncodev.com</host>
                <path>/</path>

<query></query>
            </source>
            <content>
                <![CDATA[<IMG height=10 src="images/dots.gif" width=4> Our entire team is committed to
transforming our clients' businesses utilizing a range of industry leading
applications and custom software solutions to meet any specific need and
business challenge. We mold technology to optimize your business processes and
ultimately <I>maximize your bottom line.</I><BR>]]>
            </content>
        </frame></frames>
</amplification>
```

Figure 12:
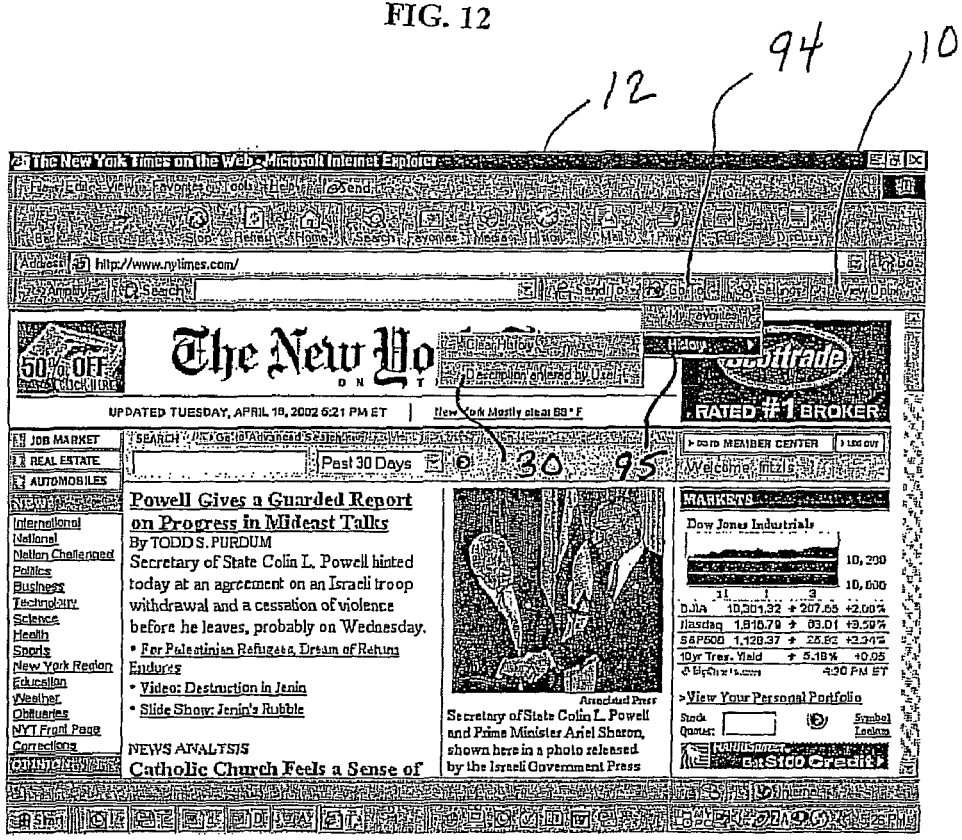
FIG. 12 is an image of the (Go To) History menu item of the Main Toolbar.
Figure 13:
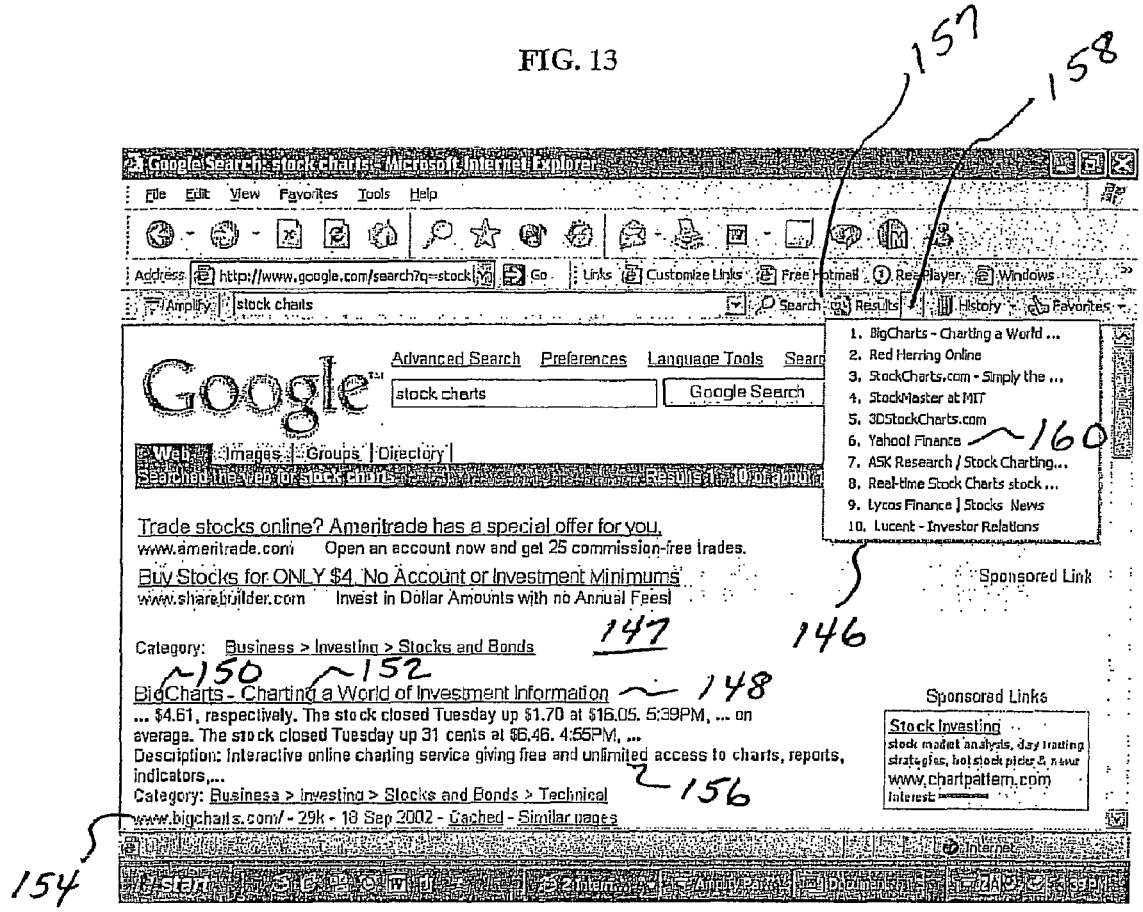
FIG. 13 is an image of a Return To Search Results icon and a condensed Search Results List.

Referring to FIG. 12, the Main Toolbar 10 includes a GoTo 94 icon, that presents a History 95 menu item list, that in turn presents a Most Recently Used (MRU) List 96 of Custom Selection Windows, in preferably chronological order of use. Preferably, the windows are identified in the MRU List 96 by their Descriptions 30. The MRU List 96 is preferably limited to a predetermined number of windows, for example the last 20 used, such that the MRU List 96 is a dynamic list providing convenient access to recently used Custom Selection Windows. The User may recreate a Custom Selection Window from the MRU List 96 by clicking on the Description for the window. Upon selection of a Custom Selection Window from the MRU List 96, the software locates and retrieves the Window Definition from the memory device of the computing device or from the Server using the unique Window Identifier, recreates the Custom Selection Window and loads the content items directly from the original source of each item, as recorded in the Window Definition.

Assisted Content Selection

Figure 14:
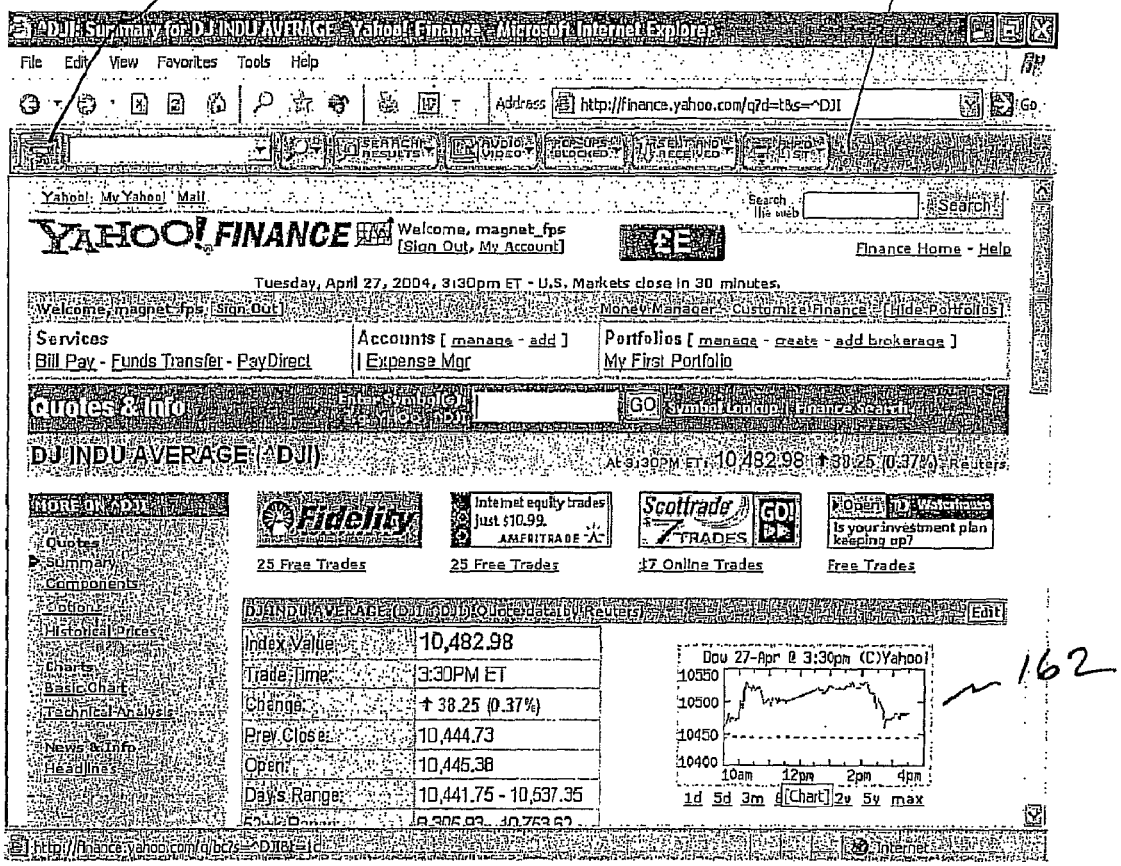
FIG. 14 is an image of an Internet browser application showing a temporary border around a content item.

Referring to FIG. 14, the Assisted Content Selection feature of the system provides the user with a high degree of certainty, control and advance notice of the content items that are to be selected. Preferably, the Assisted Content Selection function may be turned on (or off) by the user with the selection (click) of an activation icon 160 on the Main Toolbar 10.

When the Assisted Content Selection feature is active, a distinctive, temporary (HTML) border 162 appears around any content item 18 over which the point device, such as a mouse is placed (i.e., on a mouseover event). Preferably, the border is dashed and is a visually distinctive color, such as green or yellow. The border lasts only as long as the mouse is over a content item, and disappears when the mouse exits the area of the content item.

Preferably, the borders for different types of content items are visually distinctive from one another. For example, if the content item is an HTML table or a cell in an HTML table, the border may be green, and if the content item is an image item or a text item, etc., the border may be yellow. In this manner, the user can quickly and accurately determine not only which content item will be selected but also the type of content item.

The Assisted Content Selection feature is particularly useful when selecting HTML tables, rows and/or cells, and content items within those cells. A particular content item within a cell may be accurately selected by activating the Assisted Content Selection feature and directing the mouse over the content item until a yellow border appears around the desired content item, at which time the user may select the identified content item with a "right click," as described above or with a "left click."

A right click will produce the standard drop down menu 22 and a Select Content Item Function 20 of FIG. 3 as described above in Selecting Content Items. A left click will bypass the standard drop down menu 22 and Select Content Item Function 20 and will proceed according to the subsequent steps as described above in Selecting Content Items and Inserting Additional Content Items Into a Custom Selection Window.

It should be noted that when the Assisted Content Selection feature is active, a left click on a hypertext item will select the content item and will not activate the hypertext link. In other words, this feature intercepts the user input which would ordinarily activate the hypertext link. When the feature is deactivated, normal hypertext linking is re-established. This can be advantageous when trying to select content items having hypertext links.

Figure 15:
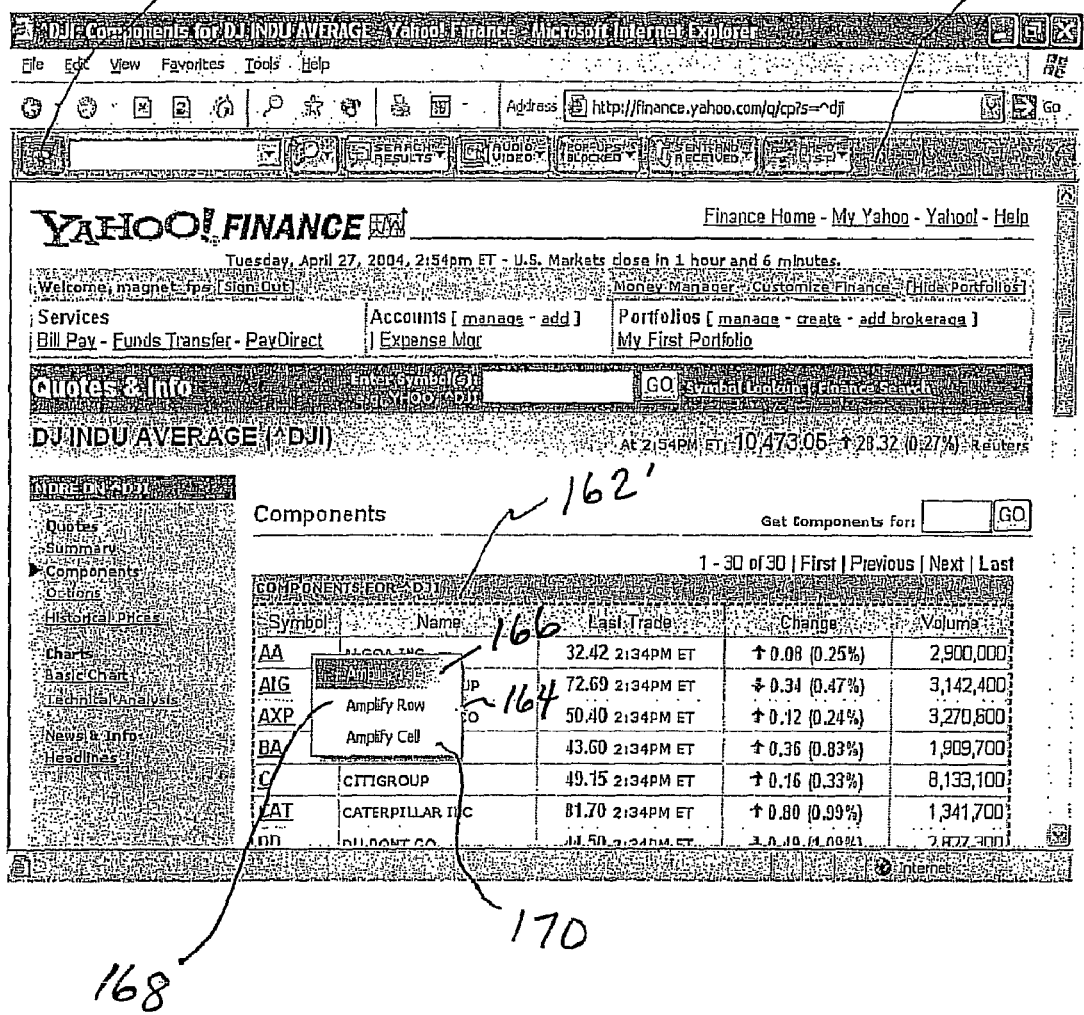
FIG. 15 is an image of an Internet browser application showing a temporary border around an HTML table.
Figure 16:
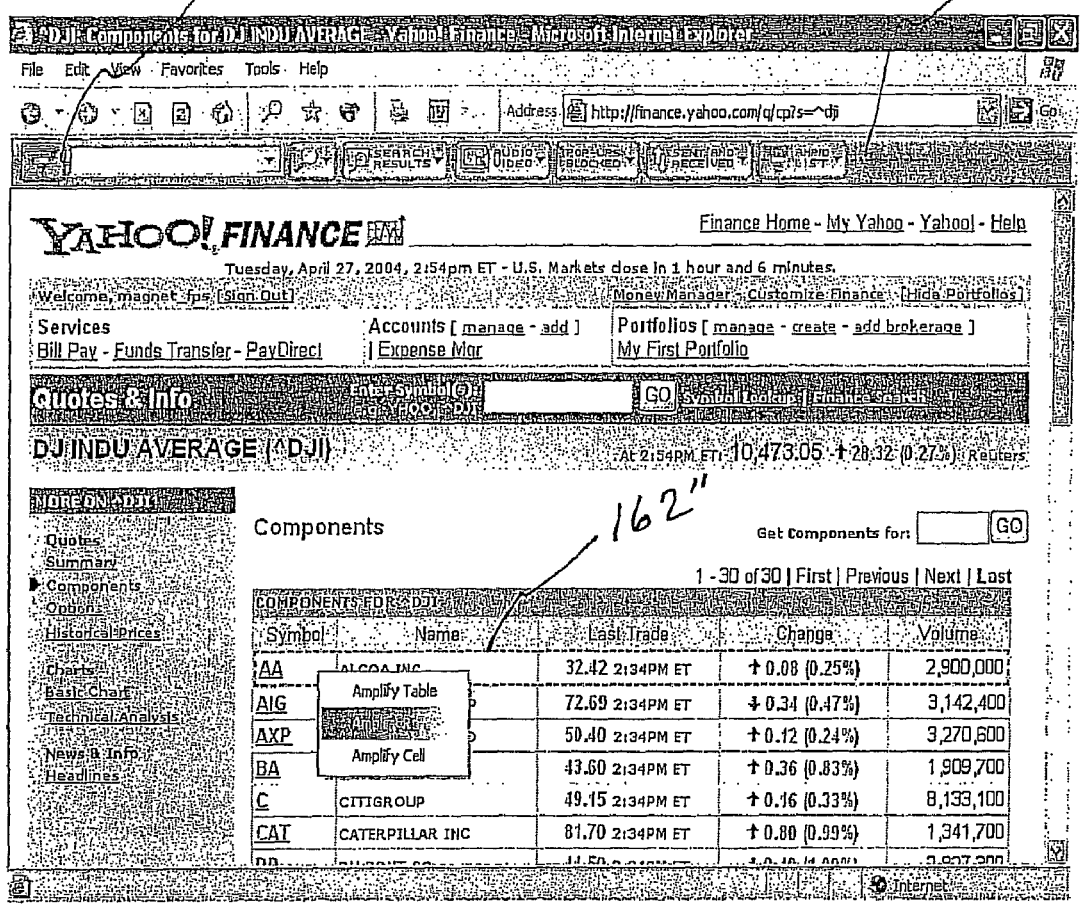
FIG. 16 is an image of an Internet browser application showing a temporary border around a row of an HTML table.
Figure 17:
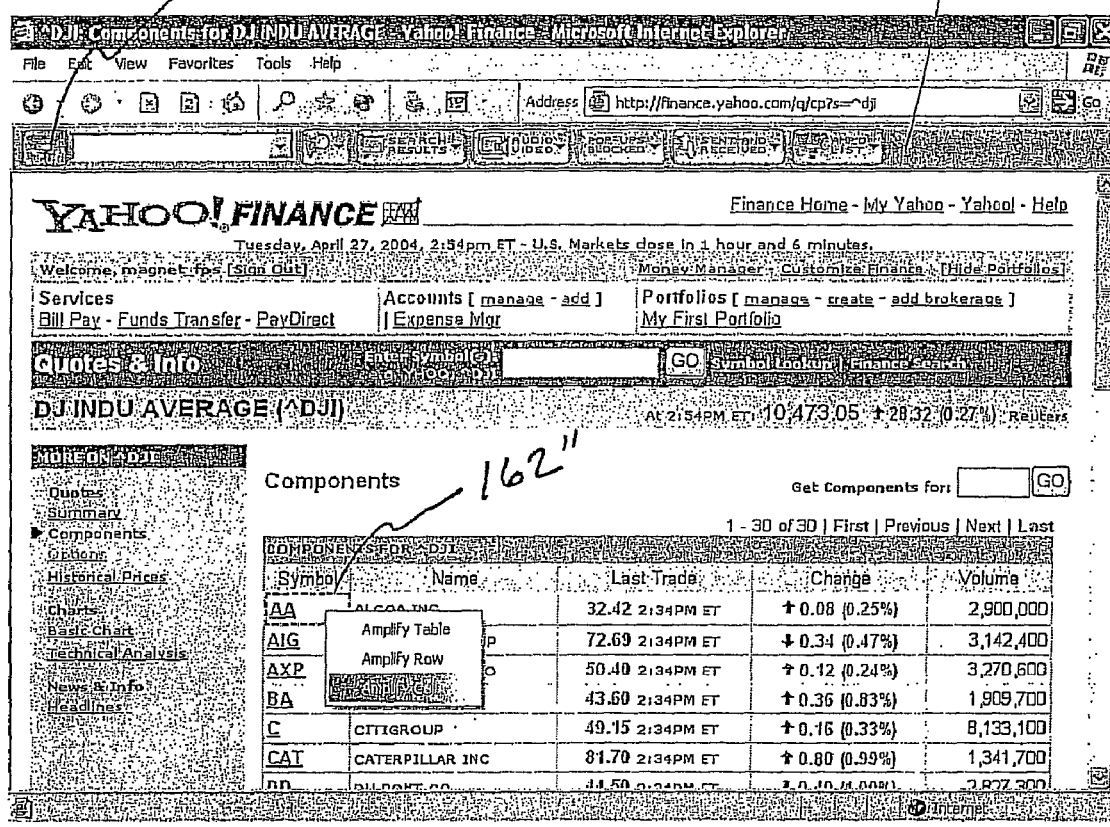
FIG. 17 is an image of an Internet browser application showing a temporary border around a cell of an HTML table.

Referring to FIGS. 15-17, a cell in which the content item is located may be selected by directing the mouse into an open region (e.g., white space) of the cell until a green border appears around the cell. The entire table may be selected by directing the mouse to a top portion of the table until a green border appears around the entire table.

Preferably, if the user selects a cell or table content item using the Assisted Content Selection feature, the system prompts the user to select the entire table, the entire row or just the current cell. Preferably, the prompt is in the form of a pop-up menu 164 having menu options for "Amplify Table" 166, "Amplify Row" 168 and "Amplify Cell" 170, or the like. When the user mouses over the "Select Table" menu option, a temporary border 162' is placed around the entire table. Similarly, when the user mouses over the "Select Row" or "Select Cell" menu options, a temporary border 162", 162'" is placed around the entire row or cell, respectively. Thus, the user is provided with a real-time, clear visual representation of the table components to be selected. When the "Select Row" option is chosen, a border is placed around all of the cells of the row such that the border defines a periphery of the row.

Figure 18:
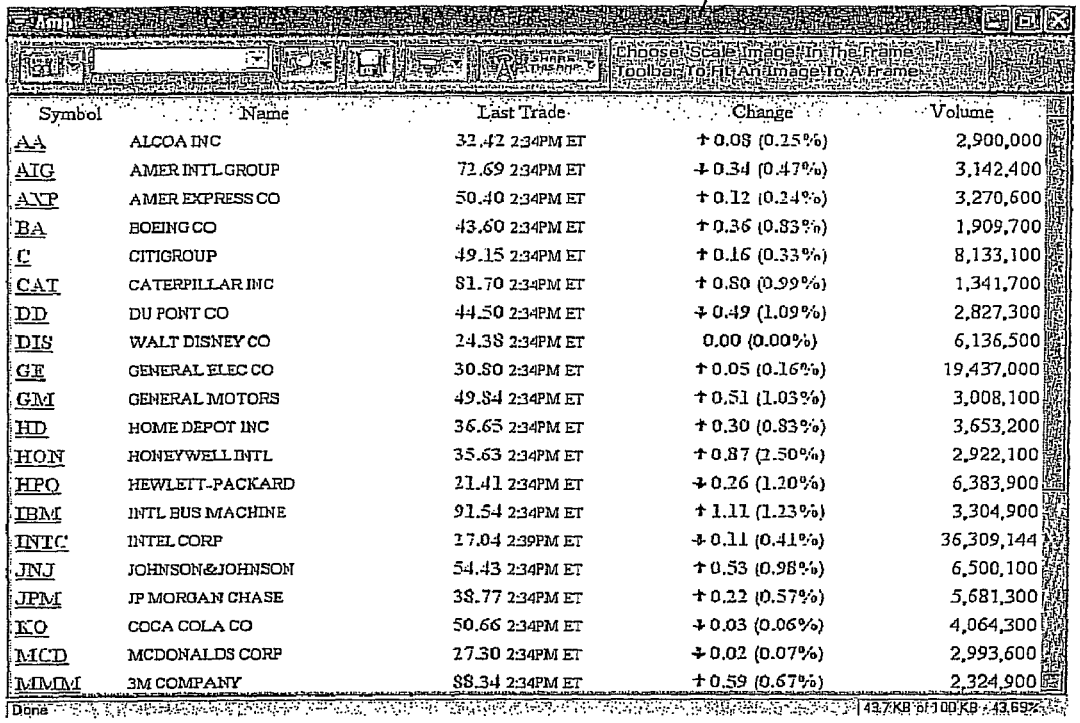
FIG. 18 is an image of a Custom Selection Window showing an HTML table selected via the Assisted Content Selection feature.

Referring to FIG. 18, when the Assisted Content Selection feature is used to select tables and table rows/cells, the formatting of the table rows/cells is preserved and is replicated in the Custom Selection Window. This formatting is maintained because, using this feature, the object defining the selected content item is identified and the properties of the object are used to create an identical or similar object in the Custom Selection Window.

Thus, when a table, row or cell is placed in a Custom Selection Window, the content items within the cells (in addition to the entire table and rows) are also selected and have the same properties as in the original table. For example, the content items have the same formatting and hypertext links as in the original table.

Preferably, the system also provides the ability to choose a number of rows within a table, where such rows may or may not be adjacent to one another. This additional feature is preferably invoked by depressing an alternate function key, such as [ALT] or [CTRL] while right (or left) clicking to select the table row. In this case, the system places a border around the selected row and prepares to accept another row selection. The border around the selected row will remain during and after the selection of the next row such that the user can easily determine the rows that have been selected. The process may be repeated to select multiple rows for placement in a Custom Selection Window. Preferably, the rows are placed in adjacent rows in a table in the Custom Selection Window. However, the properties, such as formatting and hyperlinking, remain unchanged from the original table. A similar method may be used to select multiple cells from one or more tables and/or multiple tables from a source.

An example of code suitable for this feature is set forth in Table Z.

TABLE Z

```
Private Sub oDocument_onreadystatechange( )
   Select Case oDocument.readyState
      Case "complete"
         DocumentComplete
      Case "interactive"
         bDocumentComplete = False
         bDocumentInteractive = True
      Case Else
         bDocumentComplete = False
         bDocumentInteractive = False
   End Select
   ' If the border object hasn't been inserted yet, and the document body exists, insert the border object
   If Not bHasBorderDiv And Not oDocument.body Is Nothing Then
      bHasBorderDiv = True
      oDocument.body.insertAdjacentHTML "afterBegin", "<div id=""dvAmpBorder""
style=""position:absolute;display:none;border:2px dashed yellow;z-index:999999""></div>"
   End If
```

TABLE Z-continued

```
End Sub
Private Sub oDocument_onmouseover( )
    If Not bDocumentInteractive Or bAmplifyDialogVisible Then
       Exit Sub
    End If
    Dim oObject As MSHTML.HTMLGenericElement
    Set oObject = oDocument.parentWindow.event.srcElement
    ' If we are not in amplify mode or the border object has not been loaded yet, skip highlight
    If Not frmToolband.AmplifyMode = 1 Or Not bHasBorderDiv Then
       GoTo SkipHighlight
    ' If the event object is the current object, then skip highlight
    ElseIf oDocumentWindow.event.srcElement Is oCurrentElement Then
       GoTo SkipHighlight
    ' If the event object is the border object then skip highlight
    ElseIf oDocumentWindow.event.srcElement.id = "dvAmpBorder" Then
        GoTo SkipHighlight
    End If
    ' If we have a current element, then call mouseout on it
    If Not oCurrentElement Is Nothing Then
       Call oCurrentElement_onmouseout
    End If
      ' unsupported objects so skip highlight
    Select Case oObject.tagName
       Case "INPUT", "OBJECT", "EMBED", "APPLET", "AREA"
          GoTo SkipHighlight
    End Select
    ' set a reference to the new object
    Set oCurrentElement = oObject
    ' highlight the new object
    HighlightElement oCurrentElement
   Cleanup:
    Set oObject = Nothing
End Sub
Private Sub oDocument_onmouseout( )
    ' if the event's source is the current object
    If oDocumentWindow.event.srcElement Is oCurrentElement Then
       ' if there is a target object
       If Not oDocumentWindow.event.toElement Is Nothing Then
          'if the target is not the border div
          If Not oDocumentWindow.event.toElement.id = "dvAmpBorder" Then
             Call oCurrentElement_onmouseout
          End If
       Else
          Call oCurrentElement_onmouseout
       End If
    End If
 End Sub
 Private Sub oCurrentElement_onmouseout( )
    ' if the amplify menu is visible, then quit
    If bAmplifyMenuVisible Then
       Exit Sub
    End If
    ' if the highlighted element is the current element then call mouseout on the highlight element
    If oHighlightElement Is oCurrentElement Then
       Call oHighlightElement_onmouseout
    End If
    bSelectStart = False
    oCurrentElement.onclick = Nothing
    Set oCurrentElement = Nothing
End Sub
Private Sub oHighlightElement_onmouseout( )
   Dim oBorderDiv As MSHTML.HTMLDivElement
   Set oBorderDiv = oDocument.getElementById("dvAmpBorder")
   oBorderDiv.Style.display = "none"
   oBorderDiv.onclick = Nothing
   Set oHighlightElement = Nothing
End Sub
Private Sub HighlightElement(oElement As MSHTML.HTMLGenericElement)
   On Error GoTo ReportError
   Dim oBorderDiv As MSHTML.HTMLDivElement
   If oHighlightElement Is oElement Then
      GoTo Cleanup
   End If
   If Not oHighlightElement Is Nothing Then
      Call oHighlightElement_onmouseout
   End If
   Set oBorderDiv = oDocument.getElementById("dvAmpBorder")
   Select Case UCase$(oElement.tagName)
      Case "TR"
         oBorderDiv.Style.border = "2px dashed green"
```

TABLE Z-continued

```
    oBorderDiv.Style.Width = CStr(oElement.offsetWidth + 2) + "px"
    oBorderDiv.Style.Height = CStr(oElement.offsetHeight + 2) + "px"
    oBorderDiv.Style.Left = CStr(GetDocLeft(oElement) – 3) + "px"
    oBorderDiv.Style.Top = CStr(GetDocTop(oElement) – 3) + "px"
  Case "BODY"
    oBorderDiv.Style.border = "2px dashed yellow"
    oBorderDiv.Style.Width = CStr(oElement.clientWidth – 1) + "px"
    oBorderDiv.Style.Height = CStr(oElement.clientHeight – 1) + "px"
    oBorderDiv.Style.Left = "0px"
    oBorderDiv.Style.Top = "0px"
  Case "TABLE", "TD"
    oBorderDiv.Style.border = "2px dashed green"
    oBorderDiv.Style.Width = CStr(oElement.offsetWidth + 2) + "px"
    oBorderDiv.Style.Height = CStr(oElement.offsetHeight + 2) + "px"
    oBorderDiv.Style.Left = CStr(GetDocLeft(oElement) – 3) + "px"
    oBorderDiv.Style.Top = CStr(GetDocTop(oElement) – 3) + "px"
  Case Else
    oBorderDiv.Style.border = "2px dashed yellow"
    oBorderDiv.Style.Width = CStr(oElement.offsetWidth + 2) + "px"
    oBorderDiv.Style.Height = CStr(oElement.offsetHeight + 2) + "px"
    oBorderDiv.Style.Left = CStr(GetDocLeft(oElement) – 3) + "px"
    oBorderDiv.Style.Top = CStr(GetDocTop(oElement) – 3) + "px"
  End Select
  oBorderDiv.Style.display = "block"
  Set oHighlightElement = oElement
Cleanup:
  Exit Sub
ReportError:
  ReportError "HighlightElement( )", Err
  Err.Clear
  GoTo Cleanup
End Sub
```

Referring to Table Z, to create the temporary borders described above, when a web page first loads in the browser application, the program preferably creates a transparent Border Object in the page. The Border Object is preferably created last in the HTML source such that it lies over all other objects of the page. On a mouseover event, the Border Object is relocated to the absolute position of the moused-over content item and is resized such that the border of the Border Object closely surrounds the content item. The border of the Border Object is set to the appropriate color, depending on the type of content item, and the Border Object is unhidden. This creates the border around the content item.

When the mouse exits the content item, the Border Object is hidden once again thereby removing the border. When the mouse then enters a new content item, the process repeats—relocating the Border Object, resizing the Border Object, setting the border attributes (color), and unhiding the Border Object to place a border around the next content item. Since this method of dynamically placing borders around selected content items does not modify the content item, the method does not substantially alter or move the content items of the page as the mouse is moved around the page from item to item and does not substantially decrease the performance of the users computing device.

To enable the user to select a plurality of content items at once, such a number of rows or several tables, the system may create several Border Objects, either upon loading of the page, or as needed, such that temporary borders may be placed around several items simultaneously.

Instead of using a transparent Border Object, the temporary border can be created by modifying a border property of the content item itself to give the content item a border of the appropriate type and color. If the content item already has a border, the original border is stored and replaced by the temporary border on a mouseover event. When the mouse exits, the original border is replaced.

In this alternate method, to create the peripheral border around a row of a table, the system places the border on the left, top and bottom of the left-most cell of the row, on the top and bottom of the intermediate cells, and on the right, top and bottom of the right-most cell. This is effected by stepping through and modifying the properties of the cells from left to right until the right-most cell is reached.

Upon selection of a content item using this method, the entire highlighted content item, as defined by its format language (HTML) tag pair is selected by the system. For example, for a table cell, all of the content between the "<td>" and "</td>" tags is selected by the system; for an entire table, all of the content between the "<table>" and "</table>" tags is selected. No extraneous content outside the tags of the highlighted content item is selected. Therefore, the user is able to accurately and conveniently select a desired content item amongst other non-desired content items.

Enhanced Assisted Content Selection

Referring to FIGS. 19-22, as an alternative to the pop-up menu 164 (shown in FIGS. 15-17), the Assisted Content Selection feature may include a Graphical Interface whereby the User may step up or down in a hierarchy of the current document to select a desired or preferred content item or group of content items.

As described above, this feature is preferably initially activated by selecting an activation icon 160 on the Main Toolbar 10 which produces a temporary HTML border 162 around the content item 18 over which the pointing device is currently located.

A right click, or another suitable predetermined function, produces an Assisted Content Selection Graphic Interface 400 operable to allow the user to step up and down in the hierarchy of the current document.

Figure 19:
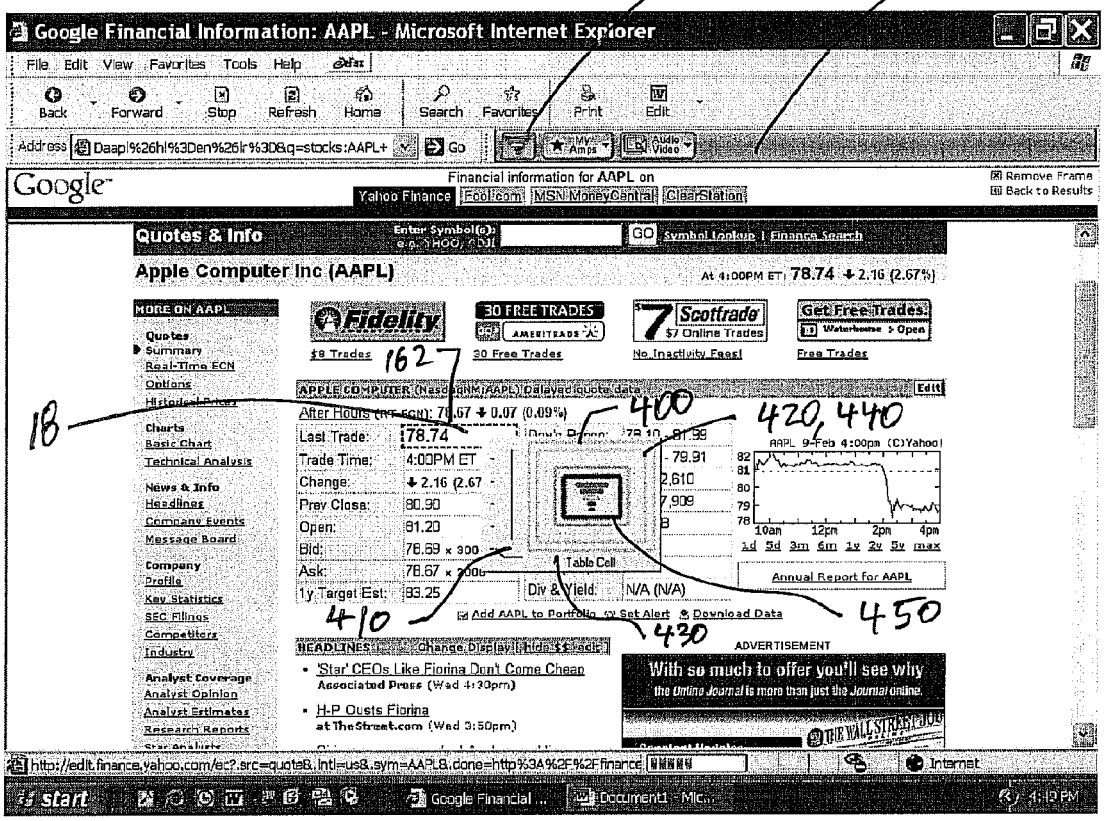
FIGS. 19-22 are images of an Internet browser application showing a Graphic Interface operable to step through a hierarchy of a network source.

As shown in FIG. 19, the Graphic Interface 400 preferably includes a Slide Bar 410 having a predetermined number of discreet positions between a first end position and a second end position, which discreet positions correspond to hierarchical positions in the source code (e.g., HTML) of the document. The Graphic Interface 400 may also include a Hierarchical Graphic 420 comprising a series of Concentric Graphics 440 (such as squares), one of which is highlighted or otherwise altered to indicate the relative hierarchical position of a currently selected content item 18.

In the first instance, an innermost Concentric Graphic 450 is highlighted to indicate the originally selected content item 18, which is preferably the lowermost position in the selectable hierarchy. It can be appreciated, however, that the ability to step downwardly from the originally selected content item 18 is within the scope of the present invention.

Further, the Graphic Interface 400 preferably includes a Text Label 430 which indicates a type of the currently selected content item 18, such as "Table Cell," as shown.

Figure 20:
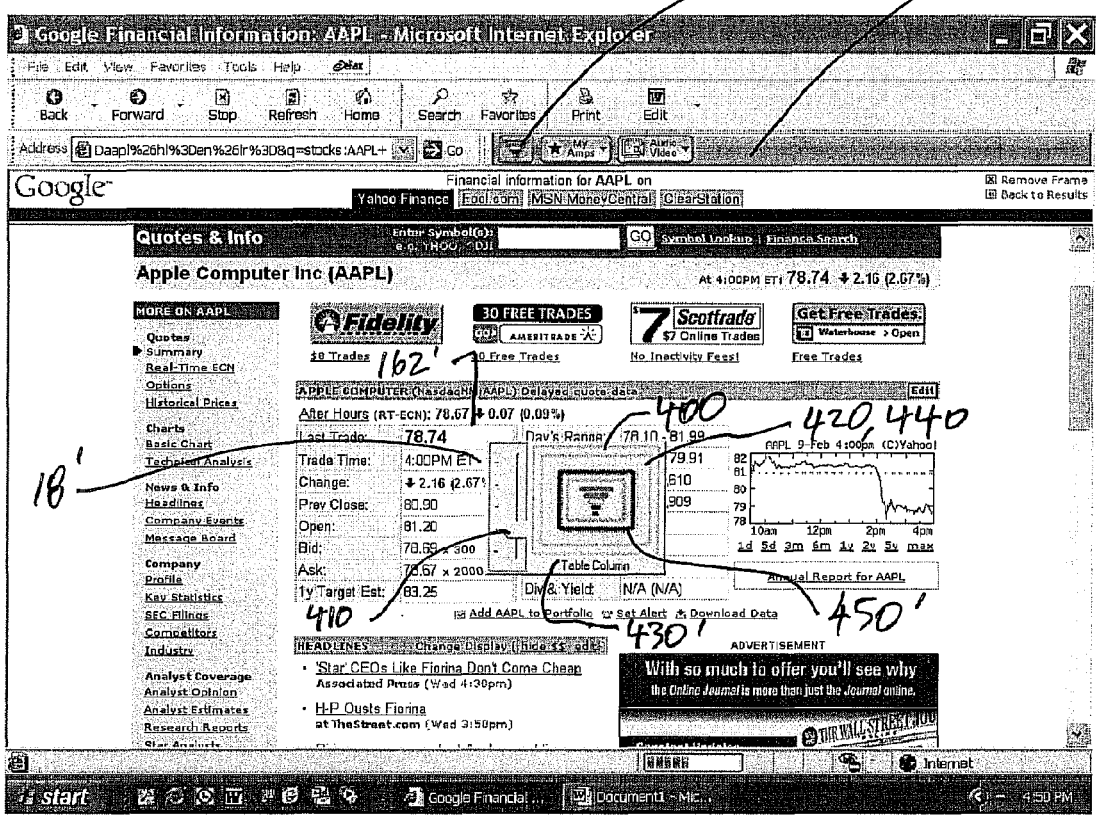

Referring to FIG. 20, when the Slide Bar 410 is moved to a second position, the selected content item 18' moves upwardly in the hierarchy of the document, preferably one step.

If the previously selected content item 18 was a table cell, the system preferably next selects the entire column that comprises the cell as the currently selected content item 18'. Since HTML pages typically do not include column objects or column tags, the system preferably determines the column by analyzing the document. The details of this analysis are set forth below.

Upon movement of the Slide Bar 410 to the second position, a temporary border 162' is placed around the currently selected item 18', such as the column shown. In addition, the Hierarchical Graphic 420 is changed to indicate the relative position of the currently selected content item 18'. Specifically, a second Concentric Graphic 450' is highlighted to indicate one step up from the originally selected content item. As discussed above, if the previously selected content item was a table cell, the next selected content item is preferably the column of the table cell, which may be a "virtual" object defined by the system of the present invention.

Further, the Text Label 430' is preferably altered to indicate the type of the currently selected content item 18', such as "Table Column."

At this point, or any point in the selection process, the user may select the currently selected content item 18' by clicking an area of the Graphic Interface 400 outside the Slide Bar 410 area, such as on the Hierarchical Graphic 420. Doing so initiates the procedure to add the selected content item to a new or existing Custom Selection Window as described above.

Figure 21:
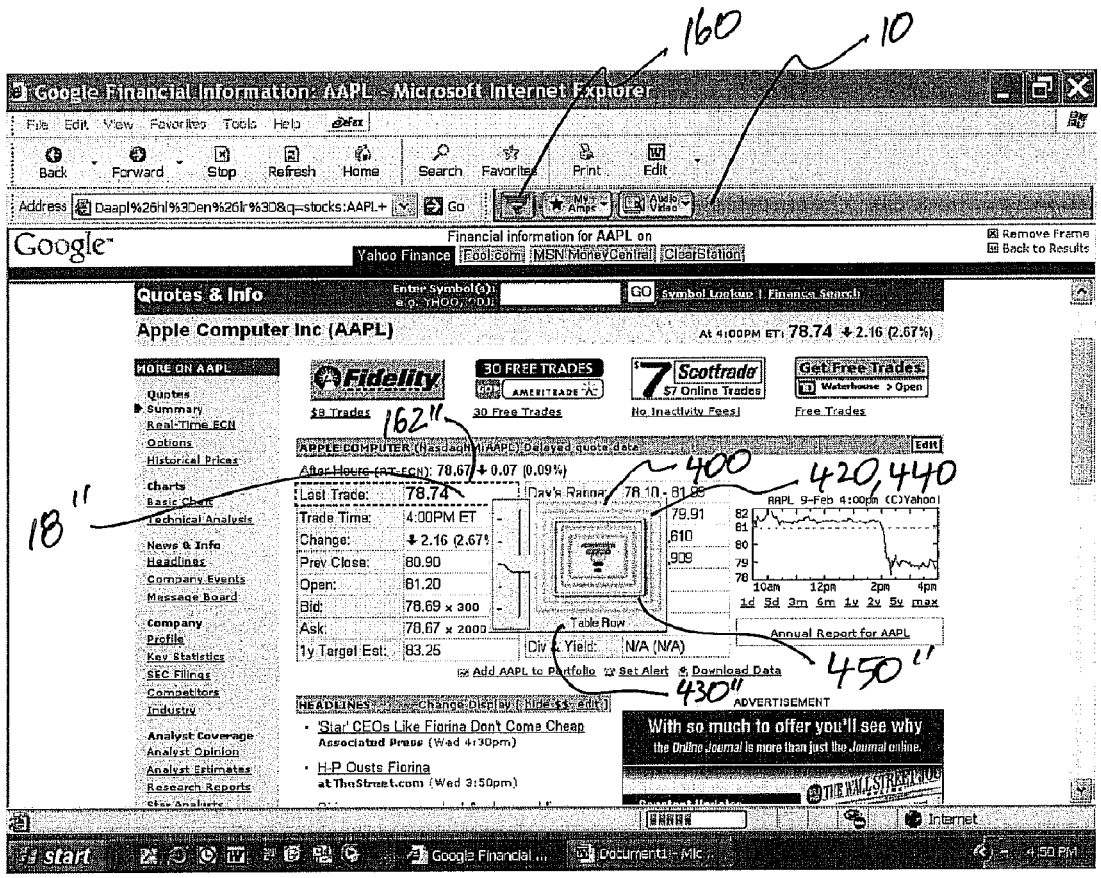
Figure 22:
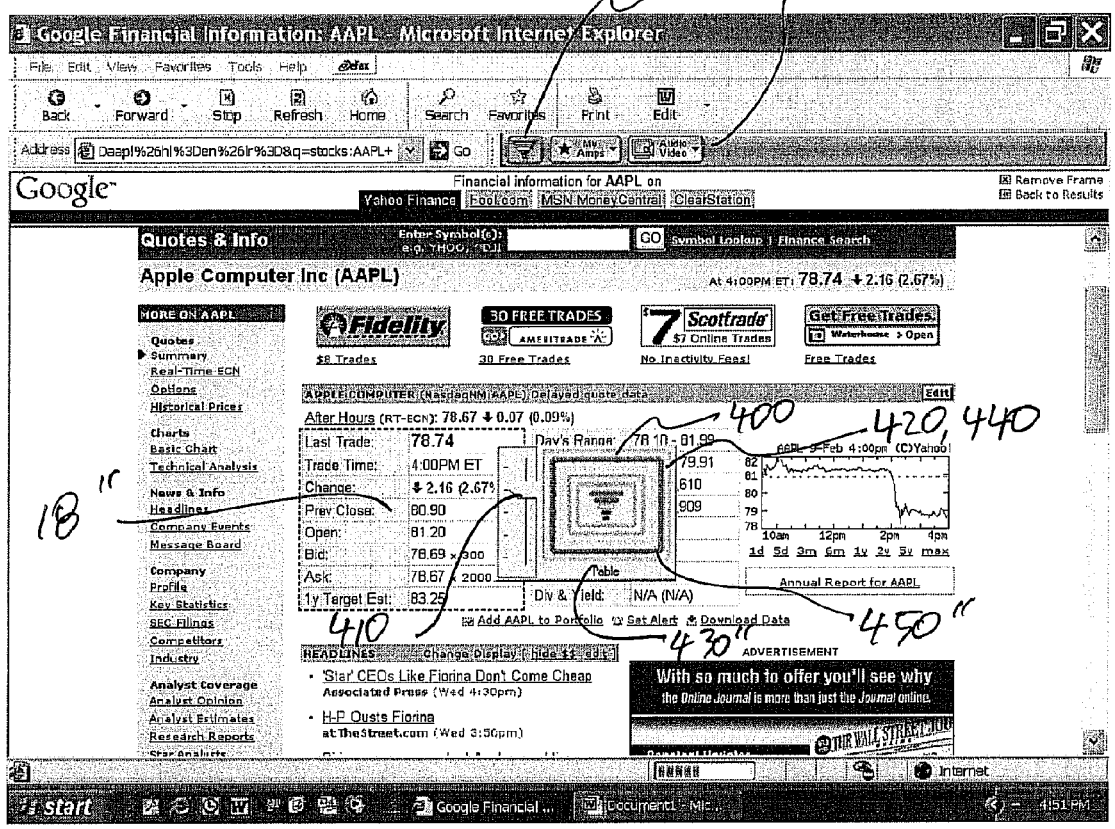

Referring to FIGS. 21 and 22, moving the Slide Bar 410 further upward steps further upward in the document hierarchy. As depicted in FIG. 21, if the previous content item 18' was a table column, the next selected content item 18" is preferably a row of the originally selected table cell 18. Continuing upward, as in FIG. 22, if the previous content item 18" was a table row, the next selected content item 18'" is preferably the entire table.

As before, movement of the Slide Bar 410 induces changes in the temporary border 162", 162'", Concentric Graphics 450", 450'" and Text Label 430", 430'" to indicate the identity, position and type of the currently selected content item 18", 18'", respectively.

Upon activation of the Enhanced Assisted Content Selection feature (e.g., by right clicking on a content item around which a temporary border appears), the system preferably analyzes the document to identify a series of objects within a predetermined number of steps in the document hierarchy from the originally selected content item. Specifically, the system preferably analyzes the document to determine the currently selected content item and the next four objects above the currently selected content item in the document heirarcy. Preferably, the system analyzes the document by inspecting the HTML tags of the objects.

If one of the analyzed objects is a table cell (e.g., TD), the next object is preferably set to be the column which includes the table cell. Further, if one of the objects analyzed has a tag indicating that it is a table body (e.g., TBODY), this object is skipped and the next object is analyzed. During the analysis of the objects in the document, the system stores a tag name of each object. Preferably, the tag name is equal to or derived from the associated HTML tag in the document. If the object is a column, the stored tag is preferably set to "COL" or another suitable distinctive tag.

After the analysis of the document is complete, the system displays the Assisted Content Selection Graphic Interface 400 in which the Slide Bar 410 is in a lowermost position and Hierarchical Graphic 420 is in an innermost position.

Upon movement of the Slide Bar 410 by the User, the system executes a predefined number of steps to step through the objects and the associated stored tags, beginning with the originally selected content item.

If the current step is not beyond a current position of the Slide Bar 410, the stored tag associated with the object of the current step is analyzed. If the current stored tag is equal to "COL," or another predetermined stored tag for columns, a Column Flag is set to True. If the current stored tag is not equal to "COL," or the other predetermined stored tag for columns, the Column Flag is set to False and a parent object is set as the current object. However if this parent object has an HTML tag of "TBODY" the parent of the parent object is selected.

If the current step is associated with (i.e., has reached) the current position of the Slide Bar 410, the associated Concentric Graphic 440 is activated (i.e., turned on). Otherwise, the associated Concentric Graphic 440 is turned off. Then, the next step in the series is executed until the predetermined number of steps have been completed.

Upon the completion of the series of steps, the Text Label 430 associated with the currently selected content item is updated and the temporary border 162 is placed around the item associated with the current position of the Slide Bar 410.

If the currently selected content item is a column, the temporary border is created around the column by selectively activating (i.e., turning on) the borders of certain edges of the table cells that comprise the column. Specifically, the top, right and left edges of the topmost cell are activated, along with the bottom, right and left edges of the bottommost cell, and the left and right edges of any intermediate cells. This is effected by stepping through and modifying the properties of the cells of the column. This provides a contiguous border around the column to visually identify the column to the User.

The content items within each cell of the column are extracted for inclusion in a Custom Selection Window by first determining an index position of a reference cell within the column. This reference cell may be the originally selected content item or a cell selected via the Slide Bar 410. Next, the system steps through each row of the associated table and extracts the content from each cell in the same index position as that of the reference cell. The extracted content may then be placed in a new table (1 column by N rows) in a Custom Selection Window using the method described above for adding content items to a new or existing Custom Selection Window.

Further Enhanced Content Selection

As set forth in the description of the Enhanced Content Selection feature above, the system is operable to analyze objects in the hierarchical lineage of an initially selected content item (or moused-over content item) and is operable to define a group of selectable objects in that lineage. The system is also operable produce a graphical alternate selection interface, such as Slide Bar 410 to permit the user to select an alternate content item in the lineage of the initially selected content item. Preferably, the system creates a graphical selection indicator, such as the temporary border 162, which moves from the initially selected content item to the alternate content item upon the selection of an alternate content item by the user. Such graphical selection indicator may alternatively be a transparent or translucent overlay substantially immediately around or substantially coextensively over the content item.

When analyzing the document to identify and define the group of selectable objects in the document hierarchy, the system preferably skips, or excludes objects that are substantially visually identical or redundant to an (immediate) parent object. Preferably, during the analysis, the system compares the height and/or width dimensions (e.g., in pixels) of the currently analyzed object to that of its parent object to determine if the differences in the corresponding height and/or width dimensions are at least a predetermined value or values (e.g., about 10 pixels). If the differences are less than the predetermined value(s), then the currently analyzed object is excluded from the group of selectable objects and the parent object is set to the currently analyzed object. This process is repeated until an object is found that is sufficiently different than its parent object. Once an object is found that is sufficiently different than its parent object, such object is designated as a selectable object in the group of selectable objects and is represented by one of the positions on the Slide Bar 410 described above.

It has been found that hierarchically sequential objects having differences in height or width dimensions of less than about 10 pixels are typically identical or nearly identical in appearance (and content) and thus appear the same to a user. An example of such similar appearing objects would be an image occupying an entire table cell. In such an instance, the system would exclude the image object, set the table cell object as the currently analyzed object and then analyze the next object in the document hierarchy. If the difference in the height and/or width dimensions between the table cell and that next object are also less than the predetermined value, then the table cell is also excluded and that next object is set as the currently analyzed object.

Also, it has been found that, of all of such apparently identical objects, it is preferable to select the hierarchically uppermost such object as the selectable object to ensure that the content item selected contains all of the object attributes perceived by the user, such as font and color attributes. However, for efficiency purposes, the first selectable content item is preferably the lowermost child object over which the pointing device is located when the initial content item is selected. Therefore, the content item (object) associated with the first position of the Slide Bar 40 may not be the hierarchically uppermost apparent "identical" object.

As described above, during the analysis of the objects in the hierarchy of the web page document, the system is operable to identify (and then select) columns and rows of tables. Preferably, during the analysis, the system excludes columns where the table has only one row and, similarly, excludes rows where the table has only one column. Such one-row columns and one-column rows are visually identical to the cell in the column/row and are, therefore, redundant to the user. This is preferably accomplished by reading the table.children.length property for rows, and the table.children(0).children.length property for columns.

FIG. 23 depicts a web page defined by the code in Table AE, below:

TABLE AE

```
<html>
<head>
<body>
<!-- ##### SAMPLE 1 ##### -->
<table style="border:blue 2px solid">
<tr>
  <td style="border:green 2px solid">Sample 1</td>
</tr>
<tr>
  <td style="border:green 2px solid">Sample 1</td>
</tr>
</table>
<br>
<!-- ##### SAMPLE 2 ##### -->
<table style="border:blue 2px solid">
<tr>
  <td style="border:green 2px solid">Sample 2</td>
  <td style="border:green 2px solid">Sample 2</td>
</tr>
</table>
<br>
<!-- ##### SAMPLE 3 ##### -->
<table style="border:blue 2px solid">
<tr>
  <td style="border:green 2px solid" align="center"><font color="blue" style="border:pink 3px solid"><b style="border:blue 3px solid">Sample 3</b></font></td>
</tr>
</table>
<br>
<!-- ##### SAMPLE 4 ##### -->
<table style="border:blue 2px solid">
<tr>
  <td style="border:green 2px solid" align="center"><font color="blue" style="border:pink 3px solid"><b style="border:blue 3px solid">Sample 4</b></font></td>
  <td style="border:green 2px solid" align="center"><font color="blue" style="border:pink 3px solid"><b style="border:blue 3px solid">Sample 4</b></font></td>
</tr>
</table>
</body>
</html>
```

Referring to FIG. 23, if a cell in the Sample 1 table is chosen, the object associated with the first position of the Slide Bar 410 would be the <bold> tag, since this is the hierarchically lowermost object that the mouse is over when the initial selection is made. After the analysis, the object associated with the second position of the Slide Bar 410 would be the <table> object because the column is excluded in the hierarchical analysis since there is only one column. Similarly, if a cell in the Sample 2 table chosen, the row is excluded since there is only one row.

If a cell in the Sample 3 table is chosen, the object associated with the first position of the Slide Bar 410 would be the <bold> tag. The object associated with the second position of the Slide Bar 410 would be <table> object because this is the next object above the first selected object that has sufficiently different dimensions than its parent object.

If a cell in the Sample 4 table is chosen, the object associated with the first position of the Slide Bar 410 would be the <bold> tag, the object associated with the second position would be the parent cell, and the object associated with the third position would be the parent table. As above, the table row is skipped because there is only one row.

Multiple Clip Mode

Figure 24:
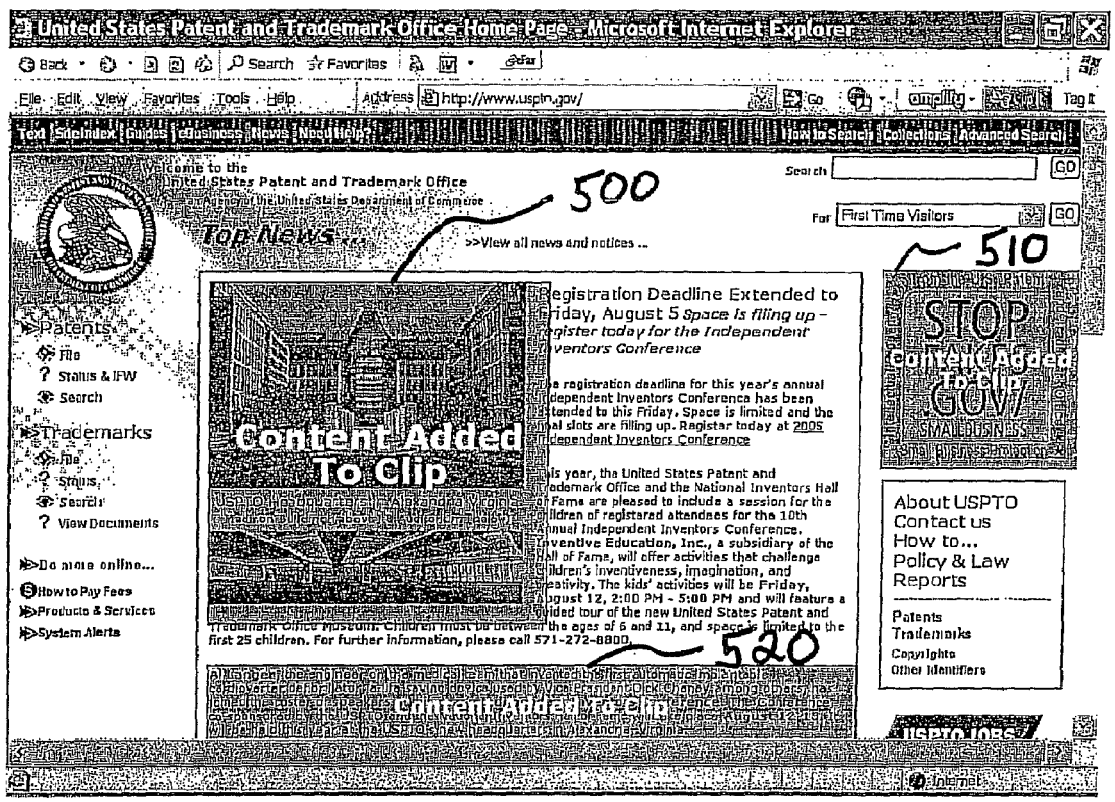
FIG. 24 is an image of an Internet browser application showing multiple graphic selection indicators overlayed over non-contiguous content items in a web page.
Figure 25:
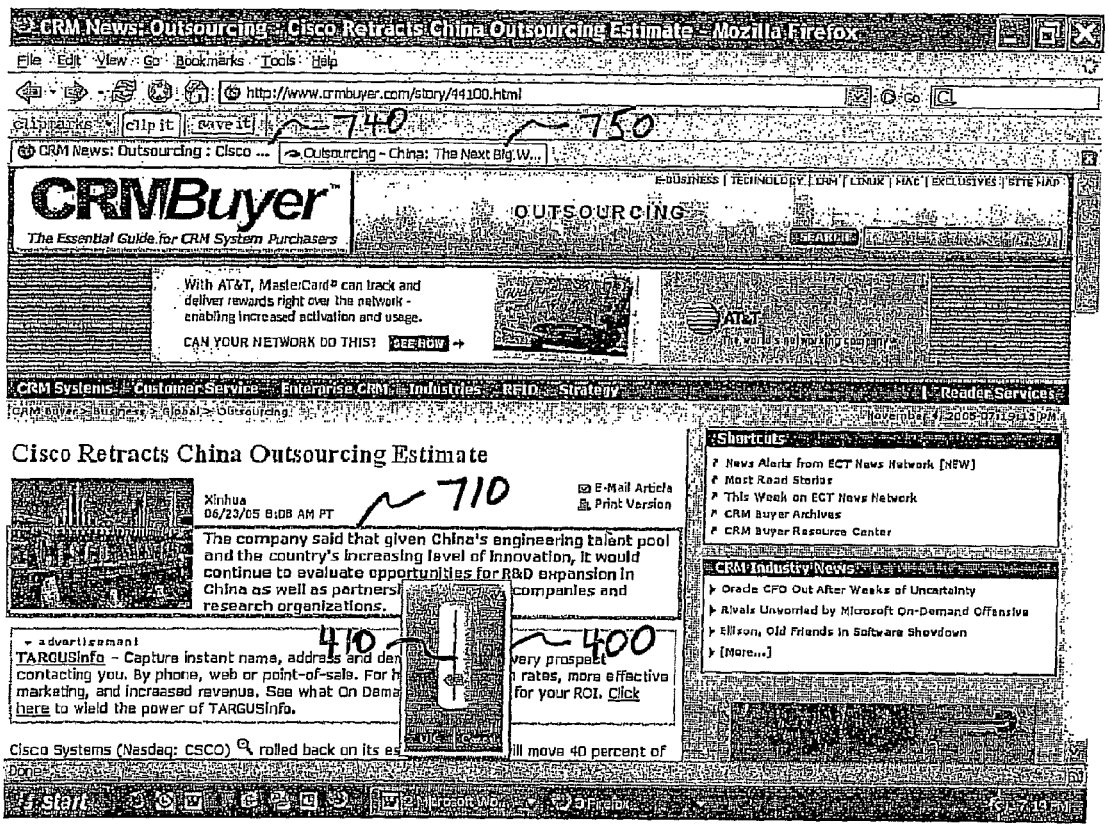
FIGS. 25-28 are images depicting selection of specific content items from disparate web pages with the Enhance Multiple Clip Mode of the system.

Referring to FIG. 24, as an alternative to using the click-and-drag method of selecting multiple content items, the system is preferably operable to select separate content items from different, contiguous or non-contiguous areas of a source web page by receiving and holding a first selection of one or more content items and then receiving and holding subsequent selections of content items (contiguous or non-contiguous with the first and any other previous selections) until the user has selected all desired content items. Preferably, each selection of content items is identified in the source web page by a graphic (i.e., visual) selection indicator 500, 510, 520, such as a colored, translucent overlays substantially coextensively over the selected content items and/or a text overlay, such as the indication "Content Added to Clip," as depicted, or a similar indication. Alternatively, such graphic selection indicator can be a border substantially immediately around the selected content item. Multiple graphic selection indicators are displayed simultaneously and are displayed until the user indicates that the selection process is complete, to provide a clear indication of all of the non-contiguous content items currently selected.

Preferably, the system prohibits (or rejects) the selection of child objects and other inferior objects of previously selected objects in the hierarchy lineage of the source web page, since the separate selection of such a child or inferior objects would be redundant. Similarly, the system preferably discards any previously selected child or other inferior objects upon the selection of a parent or other superior object in the same lineage, since the selection of the parent or superior object makes the previous selection of a child/inferior object redundant. This redundancy check may be accomplished by comparing the unique handles of the objects encompassed by the newly selected content item to the handles of previously selected content items to see if there is a redundancy. Alternatively, a suitable native function of the browser application may be employed, if present, such as the "contains" function of Windows Internet Explorer.

If a selection of a child or inferior object is discarded in favor of a selection of a parent or superior object in the same lineage, the visual selection indicator associated with the discarded selection is preferably moved to indicate the selection of the parent or superior object.

The system preferably simultaneously displays multiple graphic selection indicators 500, 510, 520 for all selected content items (that are in different lineages) until the user indicates that the selection process is complete. Upon receipt of an indication that the selection process is complete, the system stores or saves a definition of the selected content items, exclusive of non-selected ones of the content items displayed in the source web page. The definition may be stored on the user computing device or on a remote computer connected to the network for retrieval at a later time. The definition includes the complete network addresses of the selected content items. Alternately, the system is operable to display the multiple content items into an independent browser window.

Content Marks

Web browser applications commonly provide means for a user to store and organize a local list of "bookmarks" of web pages of interest locally, on their computing device. Such local web page bookmarks include the url, or network address of the web page and, upon selecting one of such local web page bookmarks, the browser application uses the stored url to re-load the associated web page.

There also exist on-line services that allow users to store similar web page bookmarks on a web server accessible over the Internet. Users may "tag" such on-line, web page bookmarks with keywords of their choosing, which keywords are searchable by users via the web server, which then produces a search result list of all such on-line, web page bookmarks tagged with the keyword or keywords.

The system of the present invention provides a significant improvement over the prior local and online web page bookmarks described above by allowing users to create and tag specific content items in web pages with a keyword or keywords, store a definition of the content item along with the keyword(s), and then search the stored definitions using search keywords. Thus, the system provides the ability to create and search novel and heretofore unknown Content Marks. In essence, what a prior on-line web page bookmark does only for an entire web page, a Content Mark of the present invention does for a specific content item of a web page.

The system allows the user to create such Content Marks in a convenient manner without leaving the source web page of the selected content item. Generally, to create a Content Mark, the user first selects the desired content item, tags it with relevant keywords of their choosing and saves it on a designated on-line web server, such as the web server at www.clipmarks.com, and/or on a local computing device. Each Content Mark is saved in the individual user's personal, keyword-searchable collection, on the designated on-line web server.

The specific content items are preferably selected according to any of the content selection methods described above. Accordingly, upon selection of a content item, the system preferably creates and stores a definition of the content item, which definition includes a complete network address of the selected content item (if the content item is file-based) and the keyword(s) entered by the user to tag the Content Mark. Additionally, the system may receive from the user, and store, further user-entered information with respect to the Content Mark, such as a title and a description of the Content Mark. Optionally, the system may permit the user to perform an advanced search of stored Content Marks using any combination of keywords, titles, descriptions, and/or any text within a selected content item.

A major improvement that the system provides over current technology is the ability to easily retain, organize and find the specific content items in web pages which, for example, could be the sixth paragraph of a long article, a quotation from a long blog post, or a photograph embedded in an otherwise cluttered page. Instead of bookmarking the entire page and then trying to remember and find what on that page was of interest to the user, the Content Marks of the present system allow a user to select and rapidly recall the specific content items of interest. Significantly, by enabling users to tag each Content Mark with relevant keywords, the system facilitates a high level of personal content organization that has not been realized before.

Enhanced Multiple Clip Mode

The system includes an Enhanced Multiple Clip Mode, which is in accordance with, and is an improvement over, the Multiple Clip Mode described above. Specifically, the Enhance Multiple Clip Mode allows users to select a group of content items from disparate source web pages loaded within a single instance of a browser application or separate instances of a browser application. Preferably, the Enhanced Multiple Clip Mode is operable by default when the user activates the content selection functionality of the system, such as by clicking on an Activation Icon 160 displayed in a Main Toolbar 10 and remains operable for all instances of a browser application until the selection process is complete, or the feature is de-activated.

Certain browser applications, such as the Firefox browser application from Mozilla, allow a user to have a plurality of disparate web pages loaded concurrently within a single instance of the browser application, and allow a user to rapidly switch between (display) a desired one of the concurrently loaded web pages by selecting a Browser Tab associated with the desired web page.

While the example below illustrates the selection of a group of content items from disparate source web pages loaded concurrently in a single instance of a browser application (using Browser Tabs), the system is also operable for a selection of such content items from disparate source web pages loaded consecutively (i.e., one after the other), either by selecting bookmarks, typing in a url, or any other means of consecutively loading source web pages in a single instance of a browser application or loaded in separate instances of the browser application.

Figure 26:
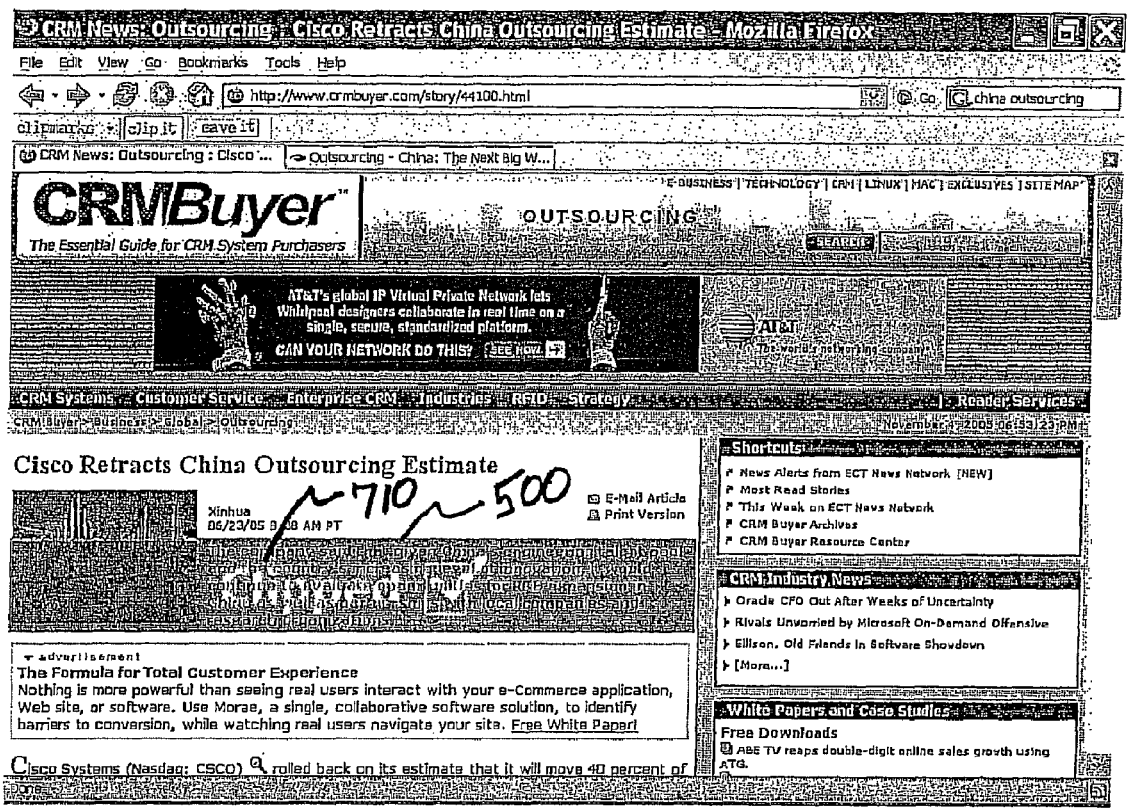

Referring to FIGS. 25-33, and following the example in the description of the Multiple Clip Mode above, if a user is doing research on outsourcing to China, a user may concurrently load first and second web pages in a browser application, which web pages may be selectively displayed by selecting first and second Browser Tabs 740, 750, respectively. The user may select a first content item 710 in the first web page according to any of the content selection methods described above. Preferably, such selection is made in accordance with the Further Enhanced Content Selection method described above, whereby the system presents an Assisted Content Selection Graphical Interface 400 with a Slide Bar 410 (FIG. 25), which allows the user to step up and down in the hierarchical lineage of the initially-selected content item. Referring to FIG. 26, when the desired content item is selected, the system preferably displays a Graphical Selection Indicator 500 (as described above) over the selected content item 710.

Figure 27:
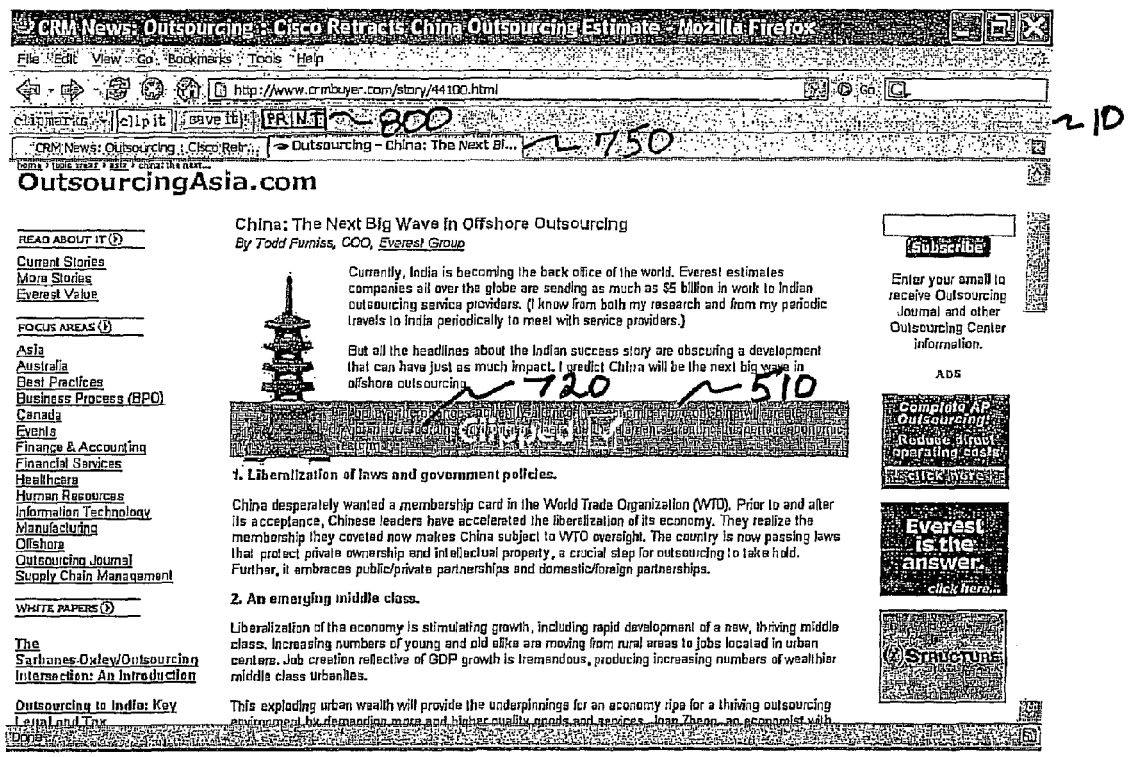
Figure 28:
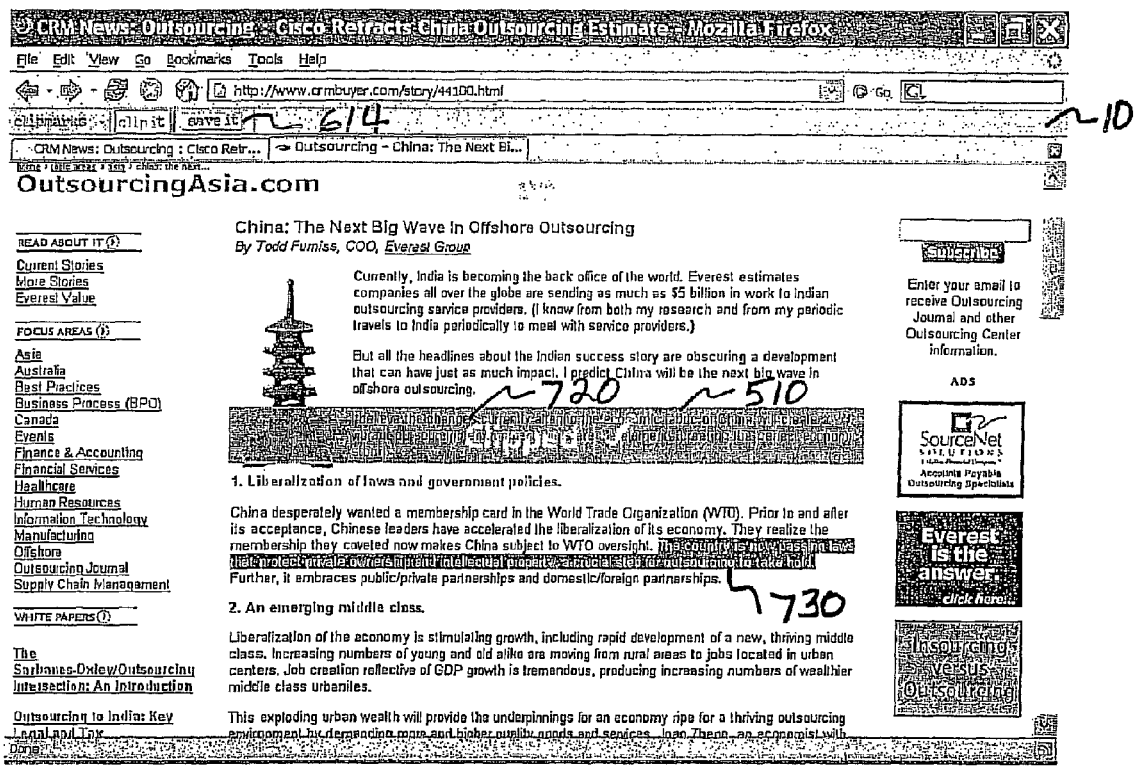

Referring to FIG. 27, the user may display the second web page by selecting the associated Browser Tab 750 in the browser application and may select a second content item 720, in the manner described above. Upon such selection, the system displays a Graphical Selection Indicator 510 over the second content item 720.

Importantly, upon the display of the second web page and upon the receipt of the selection of the second content item 720, the system retains the selection of the first content item 710. Further, if the first web page is still loaded (in a browser tab or window), the system retains the Graphical Selection Indicator 500 over the first selected content item 710. Thus, after selection of the second content item 720, the user may return to the tab or window in which the first web page is loaded to confirm or remove the first content item 710 and/or to select further content items, without losing any of the previous selections.

Referring to FIG. 27, if desired, the user may select a third content item 730, such as a string of text by performing a click-and-drag operation over the desired string. While in this example, the third selection is a string of text, the system is also operable to receive a click-and-drag selection of a contiguous group of content items, such as a group including one or more images and a string of text. Upon the receipt of the selection of the third content item 730, the system retains the selections of the first and second content items 710, 720. As can be appreciated, this third selection may be made from the first or second web page, or from a third web page. In this manner, the user is able to select a plurality of content items from several different web pages.

Upon the selection of at least one content item, the system preferably activates a Save Icon 614 in the Main Toolbar 10, which permits the user to save a definition of the selected content item(s), as described above. In addition, the Save Icon 614 is preferably activated upon a "mouseup" event, if a click-and-drag operation has been made by the user, which permits the user to select a single content item consisting of a string of text.

At this point in the above example, the user may save a single definition containing a definition of the first, second and third content items 710, 720, 730 by selecting the Save Icon 614. As described above, the definition includes the complete network location for all selected content items, and if a selected content item is a file-based content item (e.g., an image, or rich media, etc.), the definition includes the complete network location of the file-based content item whether the content item is defined in the original web page by an absolute network location (e.g., absolute url) or by a base reference (e.g., base href) and a relative network location (e.g., relative url).

In the case that the selection is a contiguous group of content items, the definition includes the base href of the original web page and the HTML source code defining the content items in the contiguous group. Thus, the definition includes all information necessary to recreate and/or reload the content items.

Figure 29:
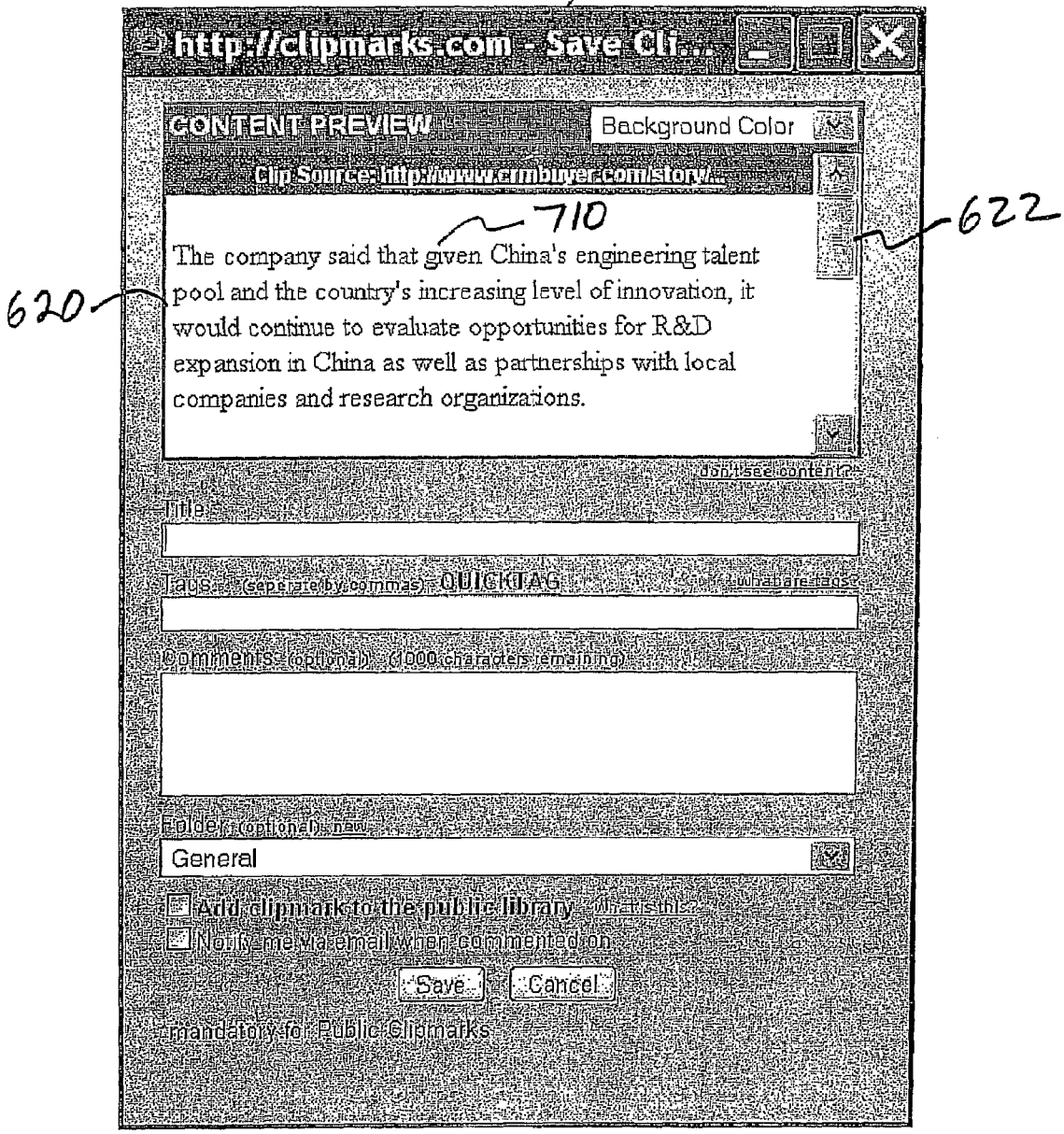
FIGS. 29-31 are images depicting the Content Mark Save Interface of the system.
Figure 30:
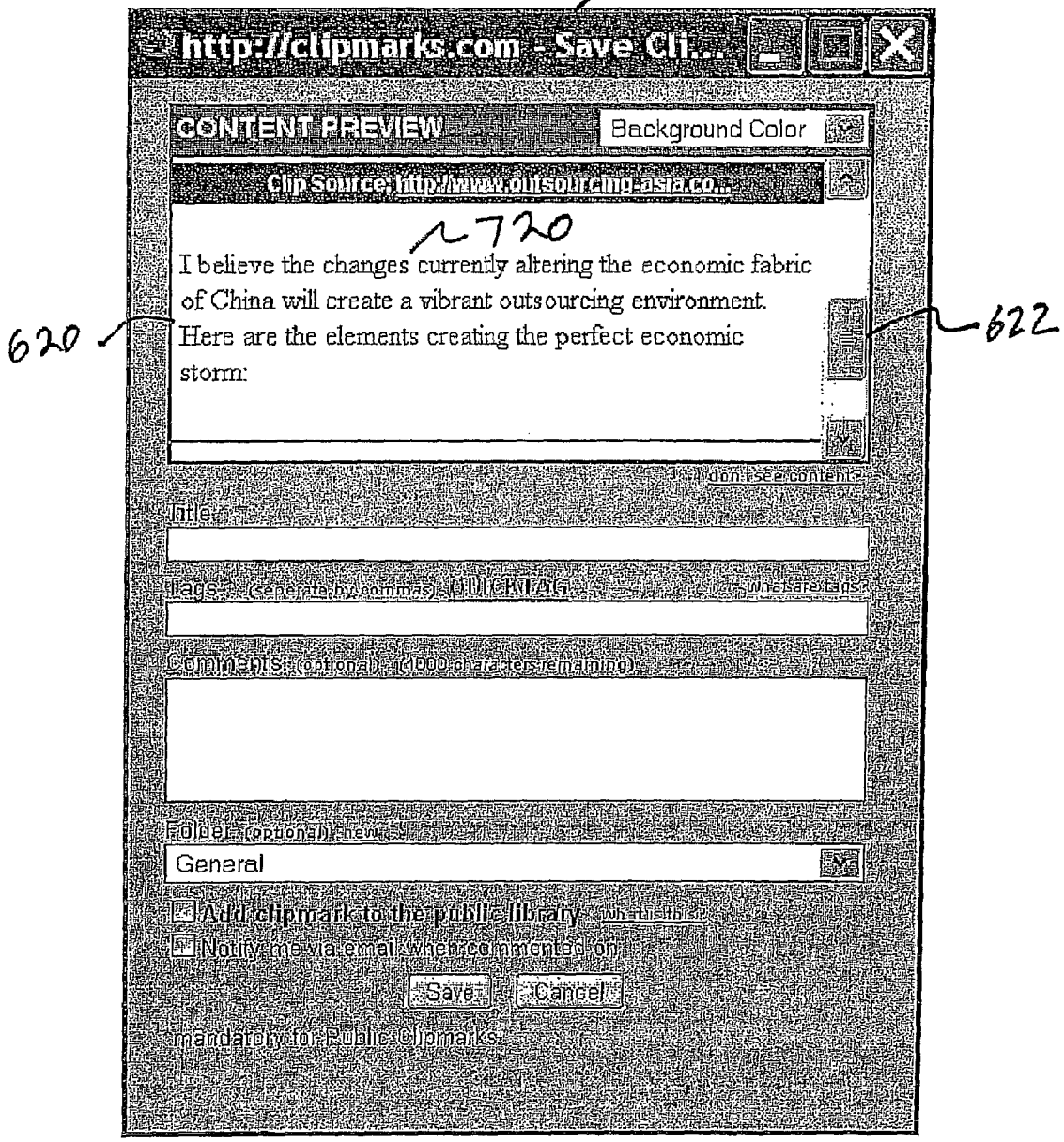
Figure 31:
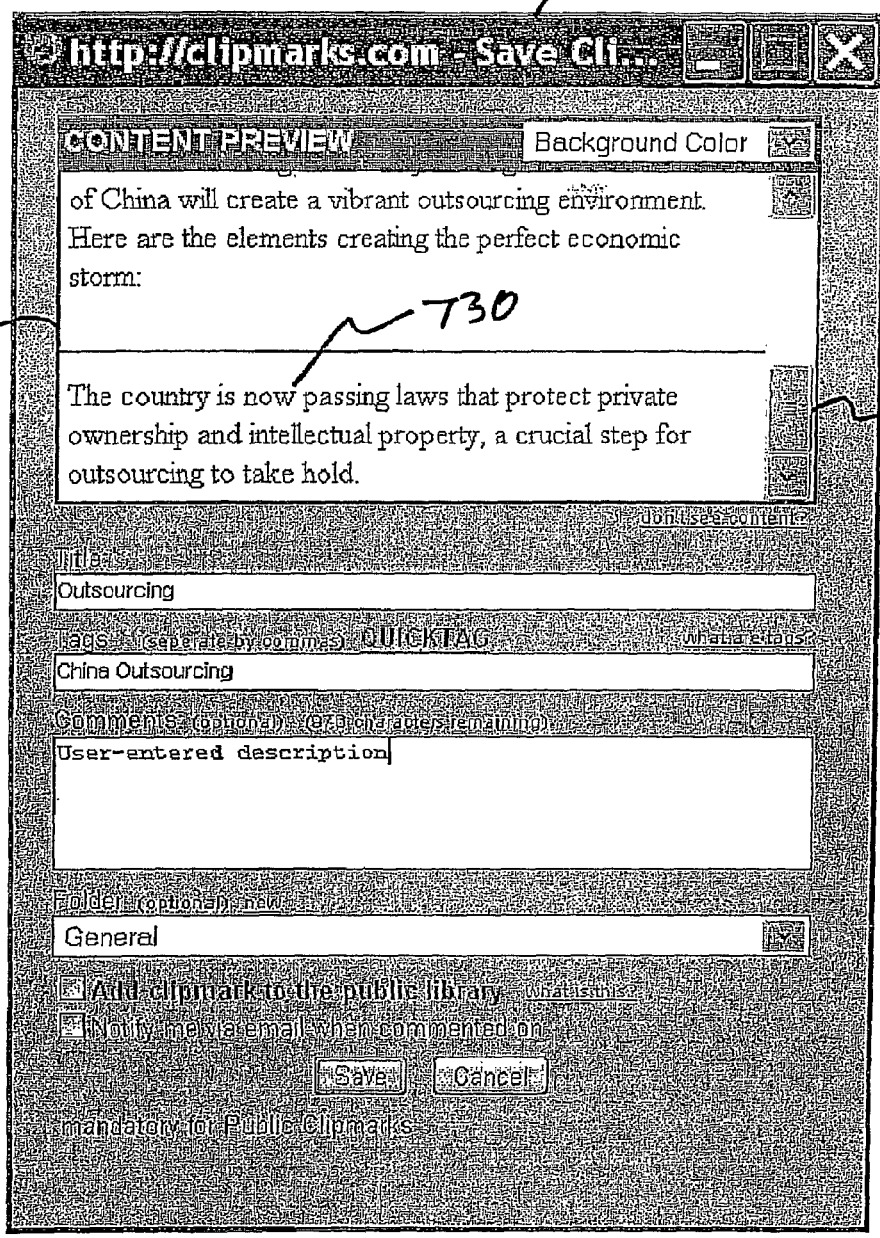

Referring to FIGS. 29-31, upon selection of the Save Icon 614, the system preferably displays a Content Mark Save Interface 618, such as that described above with respect to the Content Marks feature of the system, which interface includes a Preview Area 620 of the three selected content items 710, 720, 730. If the selected content items require more space than is provided by the Preview Area 620, the Preview Area 620 preferably includes a scroll bar 622 which permits the user to preview all selected content items. In the present example, the first content item 710 is displayed when the scroll bar is at the top (FIG. 29); the second content item 720 is displayed when the scroll bar is at the midpoint (FIG. 30); and the third content item 730 is displayed when the scroll bar is at the bottom (FIG. 31).

Referring to FIG. 31, in accordance with the Content Marks, the user is able to enter keyword(s) (or "Tags"), a Title and/or a Description/Comments for the definition, and then save, search, retrieve and re-create the definition.

Preferably, the definition of the selected content items is in an Extended Markup Language (XML) format such as in the sample definition presented in Table AD below.

TABLE AD

```
<elements version="0.9.1">
<client>
  <userAgent>Mozilla/5.0 (Windows; U; Windows NT 5.1; en-US;
  rv:1.7.12) Gecko/20050915 Firefox/1.0.7</userAgent>
</client>
<frame type="HTMLImg" background-color="#ffffff">
<source>
  <base-href />
  <protocol>http:</protocol>
  <host>www.google.com</host>
  <path>/</path>
  firefox
  <query>?client=firefox-a&rls=org.mozilla:en-US:official</query>
</source>
<image>
  <src>http://www.google.com/images/firefox/fox1.gif</src>
```

TABLE AD-continued

```
    <alt>Firefox Logo</alt>
    <height>116</height>
    <width>105</width>
   </image>
  </frame>
- <frame type="IHTMLTxtRange" background-color="#ffffff">
-  <source>
    <base-href />
    <protocol>http:</protocol>
    <host>www.mozilla.org</host>
    <path>/about/</path>

<query />
   </source>
-  <content height="27" width="682" text-color="#000000" link-color=
"#0000ee" vlink-color="#551a8b">
-   <![CDATA[
<H1>About Mozilla</H1>
   ]]>
   </content>
  </frame>
- <frame type="IHTMLTxtRange" background-color="#ffffff">
-  <source>
    <base-href />
    <protocol>http:</protocol>
    <host>www.mozilla.org</host>
    <path>/foundation/</path>
    careers.html
    <query />
   </source>
-  <content height="27" width="682" text-color="#000000" link-color=
"#0000ee" vlink-color="#551a8b">
-   <![CDATA[
<H1>Career Opportunities with the Mozilla Foundation</H1>
   ]]>
   </content>
  </frame>
 </elements>
```

The XML definition of Table AD defines three content items. The first content item is an image item (fox1.gif) and the second and third content items are table cell objects (<H1> About Mozilla</H1>, and <H1>Career Opportunities with the Mozilla Foundation </H1>). As described above, these content items may have been selected from the same or different web pages.

Preferably, the definition includes separate "element" sections for each content item in the definition. Such element sections may be defined by a pair of <frame type>-</frame> tags, as depicted. Within each element section, the definition preferably includes tags related to attributes of the source web page of the associated content item, such as the: <base-href/> of the source web page, if one is present; protocol (e.g., http:); host (e.g., www.google.com), path (e.g., /), page (e.g., firefox), and query (e.g., ?client=firefox-a&rls=org.mozilla:en-US:official).

Further, within each section, the definition preferably includes tags related to specific attributes of the associated content item, such as the network location of the content item (e.g., an absolute or relative url), if the content item is a file-based content item. The network location may be assigned to a <scr> tag, for example, the network location of the first content item (fox1.gif) defined in the above definition is the absolute network location—http://www.google.com/images/firefox/fox1.gif. Preferably, for file-based content items defined in the source web page by a relative network location (e.g., a relative url), the system uses the base-href of the source web page to determine the complete network location (e.g., absolute url) of the content item when loading the content item. Alternatively, for such file-based items defined by relative urls, the system may place the relative url in the definition by combining the base-href and relative url of the content itme. Other specific attributes of the content item in the definition may be the: alternative name <alt> (e.g., Firefox logo); height; width; and other attributes.

The inclusion of the base-href (if any) and network location within each element section provides the ability to define a plurality of file-based content items from disparate source web pages within a single definition, whether such file-based content items are defined in the source web pages by absolute or relative network locations.

While the Enhanced Multiple Clip Mode feature is particularly suitable for use in conjunction with the Content Marks feature of the system, it is also suitable for use with other features of the system, such as with the Custom Selection Window feature described above whereby selected content items are loaded into and displayed in individual frames in an independent browser window.

Further, content items selected using the Enhanced Multiple Clip Mode feature of the system, or any combination of selection methods of the system, may be copied (partially or entirely) into a general-purpose paste buffer of the operating system (or a special-purpose paste buffer dedicated to the system) on the user's computing device for later transfer to one or more target documents of another application, such as a word processing document, spreadsheet, web page, or other suitable target document. Preferably, in this instance, after identification of the desired (selected) content items is complete, the system uses the definition of the selected content items to load the selected content items from their original network locations (obtained during the selection process) and stores (copies) the selected content items in the paste buffer for later transfer.

If such paste buffer is a general-purpose paste buffer of the operating system (such as a "clipboard" of the operating system), then the selected content items may be transferred (copied) into a target document on the user's computing device in a single step, using an inherent "paste" function of the operating system. Preferably, once the selected content items are loaded into such a general-purpose paste buffer, they remain in such buffer until the buffer is cleared or overwritten such that they may be transferred into any number of target documents.

Alternatively, the system may include downloadable, plug-in applications tailored for certain target applications (e.g., word processors and spreadsheets, web page creators, etc.) that transfer the selected content items to the target documents. Preferably, for file-based content items, such plug-in applications load the selected file-based content items directly from the original network locations of the content items using the complete network address in the definition of the selected content items. Such loading may occur when (and each time) the user directs the system to copy a selected content item to a target document such that the transferred content item(s) need not pass through or reside in an intermediate paste buffer. Alternatively, the plug-in application can interface with a general- or special-purpose paste buffer, whereby content items are first loaded into such buffer and then transferred, using the plug-in application, to the target document.

Such plug-in applications preferably enable the user to selectively transfer all or certain ones of the selected content items to the target document and enable the user to direct each transferred content item (or certain ones) to a different, user-specified location in the target document, such as a specific table, row or cell, or other such specific location. Preferably, the user may identify the user-specified location by input through the user pointing device (e.g., a mouse), or other input device in the target document.

To identify the selected content items to be transferred, the system may employ a shift-register strategy to sequentially transfer the selected content items into the target document. In this manner, a content item designated as a top selected content item is transferred first, to a first location specified by the user. Then, the remaining selected content items are moved upward in the register (or a suitable pointer is moved) such that the second content item selected by the user is designated as the top content item to permit the user to transfer it to the next specified location. Preferably, the first content item selected by the user is initially designated as the top content item such that the content items are transferred in order of their selection. However, it is within the scope of the invention that the last content item selected by the user is initially designated as the top content item, and that the selected content items are transferred in reverse order. Further, preferably the system enables the user to skip (i.e., not transfer) certain selected content items and enables to the user to loop through the selected content items again such that each content item may be transferred multiple times.

Alternatively, for applications that support the pasting of HTML tables (such as Microsoft Excel), the system may receive an initial target document location from the user and then transfer each selected content item to a separate cell in the target document, for example in a common row or column.

Figure 32:
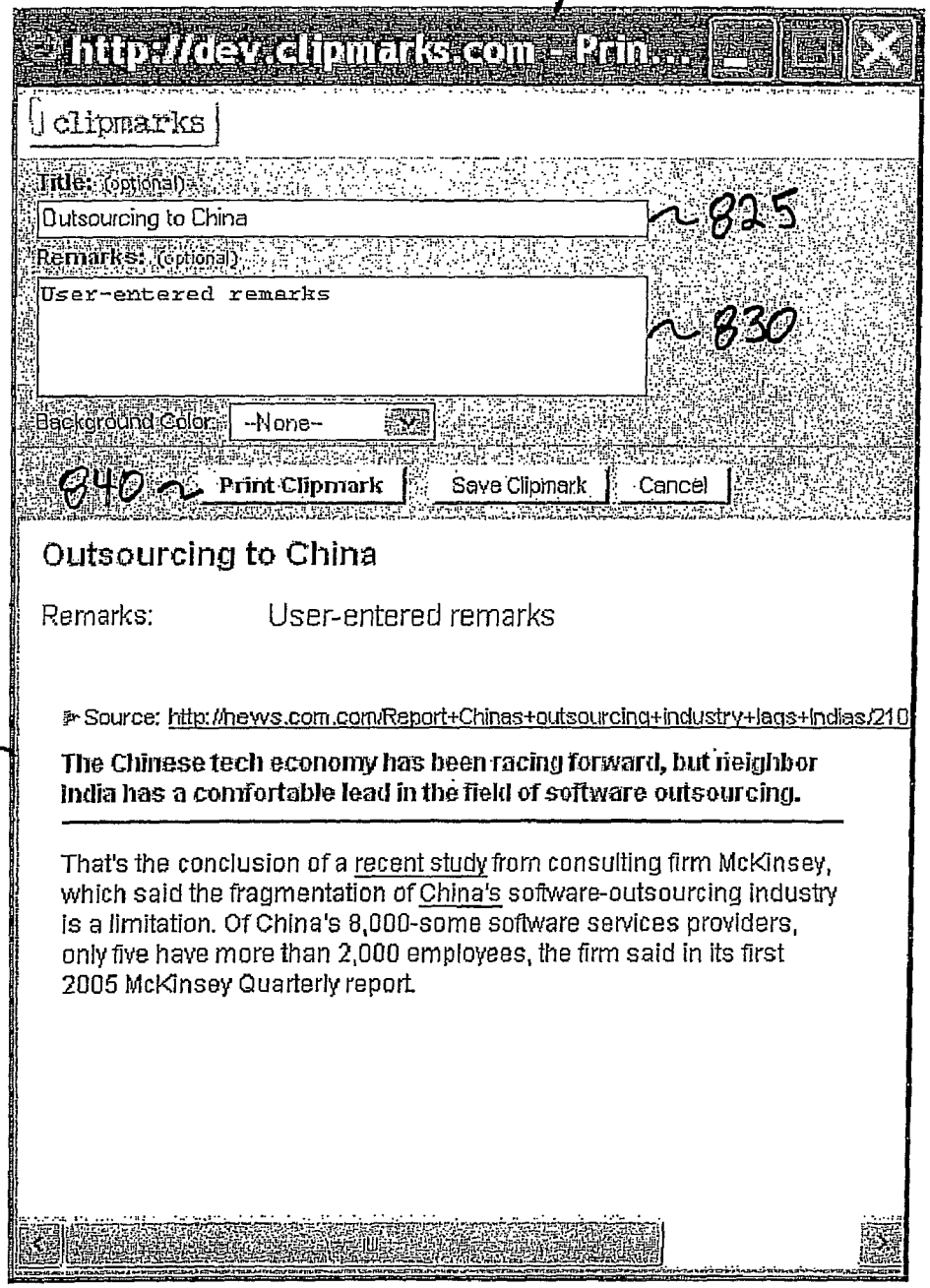
FIG. 32 is an image of the Print Dialog Window of the system.
Figure 33:
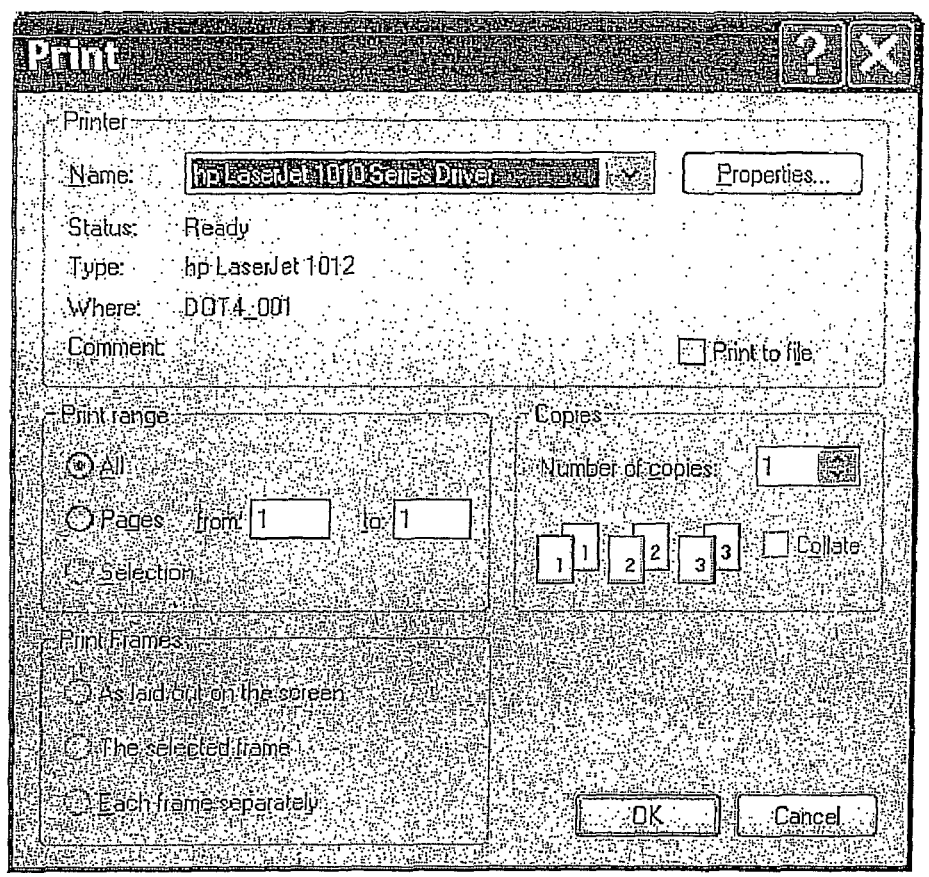
FIG. 33 is an image of a printer dialog window of the operating system of the user computing device of the system.
Figure 34:
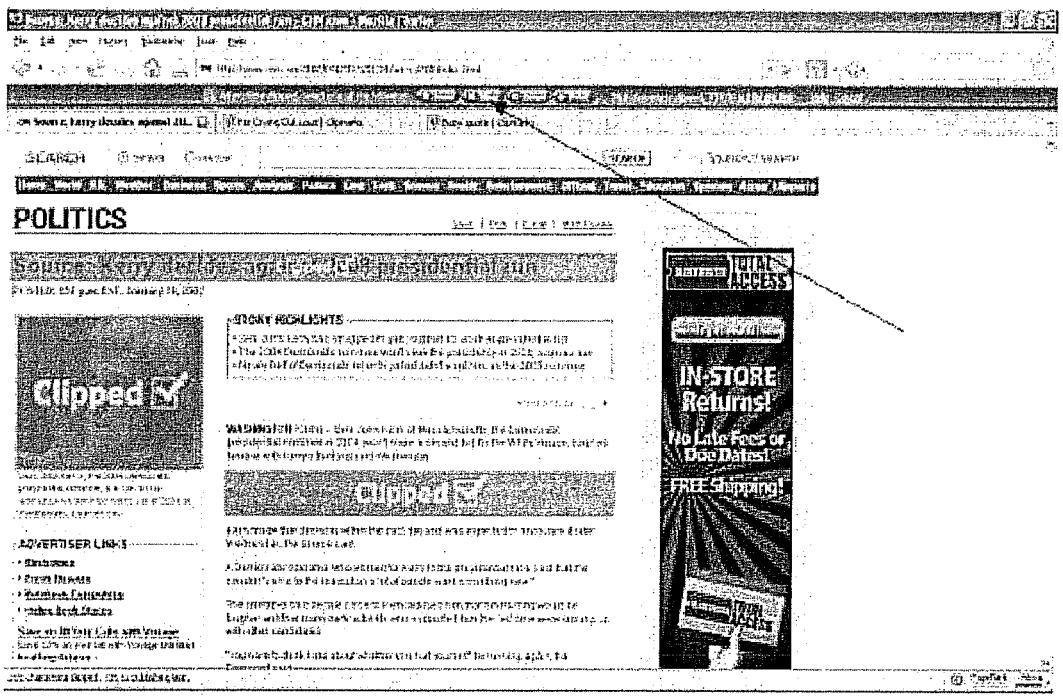
FIGS. 34-38 are images of the blog posting interfaces.
Figure 35:
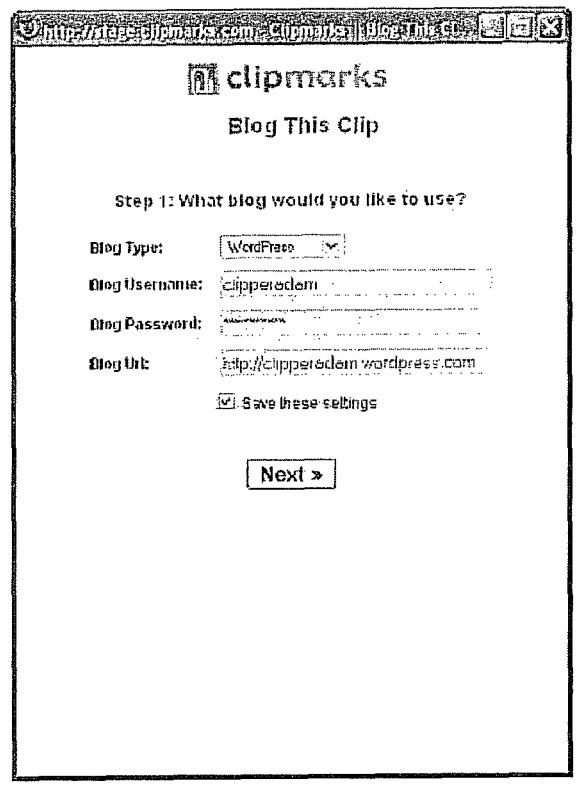
Figure 36:
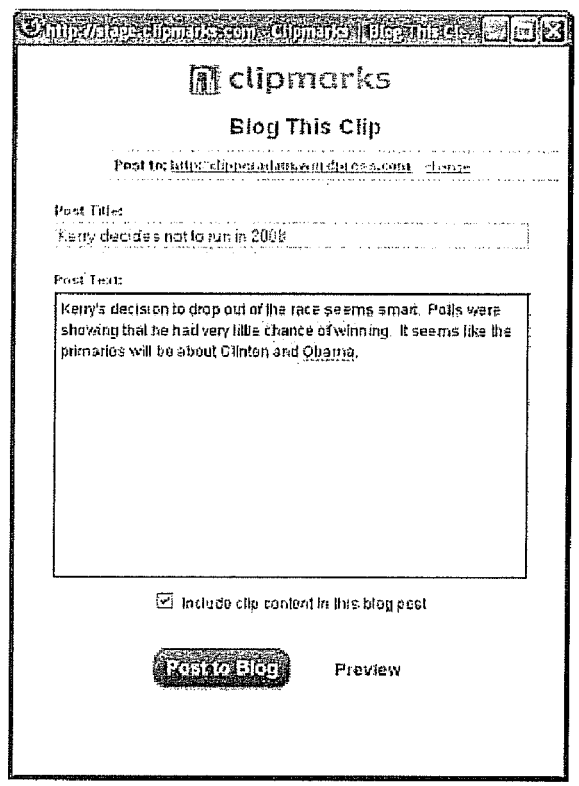

Referring to FIGS. 32 and 33, in addition to, or instead of saving a definition of the selection, the system is operable to send the selected content items to a printer accessible by the user computing device. Preferably, a Print Icon 800 (see FIG. 27) is activated in the Main Toolbar 10, upon the selection of at least one content item, or upon a "mouseup" event if a click-and-drag operation has been made by user.

As described above, during the selection process, the system compiles a selection definition of the selected content items, which selection definition includes all of the information necessary to recreate the selected content items, such as the complete network location of each selected file-based content item. Using the selection definition, the system creates a printable definition (or printable document) that is compatible with, sent to and produced by the printer.

Referring to FIG. 32, selection of the Print Icon 800 produces a Print Dialog Window 810 that includes a Print Preview Window 820 displaying all of the selected content items and the complete network location (url) for each source web page. The Print Dialog Window also includes boxes for entering a Title 825 and Remarks 830, which preferably appear in the Print Preview Window 820 in real time as they are entered by the user. The Print Dialog Window 810 also includes a Print button 840, which when selected, sends the printable definition to the printer function of the operating system of the user computing device. As depicted in FIG. 33, this preferably results in a printer dialog window, which allows the user to direct the printable definition to a desired printer.

The system preferably loads each selected, file-based content item from its original network location during creation of the printable definition. As can be appreciated, content items fully-defined by the selection definition need not be re-loaded during creation of the printable definition, but are preferably transferred from the selection definition to the printable definition. In this manner, the user is provided the powerful, and heretofore unavailable ability to print a collection of specific content items from disparate web pages in a rapid and convenient manner.

Posting Selected Content Items to Web Logs

Referring to FIGS. 34-38, the system includes a blog posting feature whereby content items selected using any one or more of the above content selection methods may be easily and conveniently posted to one or more web logs of the user (commonly known as blogs).

This feature enables users to select text, images, video, etc. from one or more web page(s) using the content selection methods (including click-and-drag) described above and then click a "Send to Blog" button in the Main Toolbar. The user can then enter their blogging service, along with their username and password and then post the selected content items directly to their blog. The user may also give a title and add remarks to their blog post. Once a user's blog account information is entered one time, it can be saved so that the user need not enter the information each time. This allows users to clip/select and then post selected content items from any web page(s) directly to their blog (or other web site) without ever leaving the page they are on. Included with the content that is sent to the blog is a link to the source page. This link is automatically included in the blog post.

The system provides a Blog icon (see FIG. 34) in the Main Toolbar on the computing device of the user, which icon is preferably activated when any content item or items are selected via the system or via click-and-drag, as described above. When the user selects the Blog icon, the system presents a blog credentials entry interface (see FIG. 35) which permits the user to enter the credentials neccessary to locate/identify and access the user's blog(s), including the type of blog (i.e., the service provider name), the username and password for the associated user account at the service provider, and the url for the blog. Preferably, the blog credentials entry interface also permits the user to save the blog credentials locally (on their computing device) and/or remotely (on a server for the system) such that the credentials information need only be entered once for each blog the user may have.

Optionally, if the user has previously saved credentials information for one or more blogs, such blogs are displayed in a list (not shown) that permits the user to select which blog(s) should receive the post. For example, the list may provide check boxes such that the user may send the post to multiple blogs simultaneously. Logging onto the system is optional, however a user account and authentication (login) is required to save blog credentials and to retrieve (use) blog credentials saved remotely on the system server. User login to the system can be automated such that the user need only key in their authentication information one time and the use is auto-reauthenticated whenever they launch their browser application. For example, the system may save a unique browser cookie on the computing device of the user having a long lifetime (e.g., 10 years), which is used to uniquely identify the user to the system, or by other suitable methods.

After completing the entry (or selection) of the blog credentials information, the system provides a blog post preview interface (see FIG. 36) similar to the preview interfaces described above, which permits the user to enter and modify the contents of the post, including a title, and the content of any selected text content items. Text content items and/or image and rich media content items are displayed in a preview pane to allow the user to confirm the selected content items before transmitting the post. Optionally, the blog post preview interface may permit the user to remove any content item prior to posting, including text, images and rich media content items. Further, the blog post interface preferably displays a list of the blog(s) selected to receive the post, and permit the user de-select any blog and/or select/add further blogs.

As described above, the system preferably presents the user with the blog credentials entry interface prior to the blog preview interface. Alternatively, the system may present the blog preview interface first and then the blog credentials entry interface, or may combine the two in one interface, or may divide the interfaces into further separate interfaces.

Optionally, the system may enable the user to post previously saved custom selections of content items to web logs, which may be saved according to the methods and features described above. In this case, the system enables the user to access/login to the system and select a previously saved custom selection, and provides an interface or suitable icon which permits the user to enter/select blog credential information and to preview and modify the blog post and receiving blogs, as described above.

Once the user is satisfied with the contents of the blog post and the receiving blogs, the user selects a Post to Blog icon, which transmits a definition of the content items selected by the user to the system server along with the blog credentials.

After the definition of the selected content items and the user's blog credentials are submitted to the system server, the system server makes a series of requests to the corresponding blog's servers (usually 1 to 3 requests, depending on the service). The protocol that is used to communicate between the servers is preferably XML-RPC, a type of XML designed to call a remote method on a remote server. Blogger API and Movable Type are industry standard XML-RPC based API's for interacting with blogs. Most blog services make use of one of these API's; however they each have subtle differences in the way that data formatting is handled. The system operator predetermines and provides the system with the current formats necessary to communicate with various blog servers and the system employs the associated current data format when communicating with a particular blog server.

Following an initial request sending a user's name and password to the blog service by the system server, a list of information about a user's blog is returned, typically in XML format. The system server then parses this returned XML for information that is necessary to submit the post in a subsequent request. Most blog services either return a BLOG ID or a special POST URL, which is required for post submission. Once this BLOG ID or POST URL is obtained, the system server formats an XML blog post (using the appropriate data format), complete with an HTML definition of the content items selected by the user (as described above), and posts this to the POST URL of the blog service. A final status code is returned by the blog service, indicating success or failure of the post. Preferably the system server uses server-side VB .NET to post and receive XML to the blog services, and POST Requests and responses occur as byte streams.

Below is a detailed example of blog submission XML code using wordpress.com. Note that "APPLICATION KEY" is not required for wordpress.com, and so is not provided. However, "APPLICATION KEY" may be required for other blog servers. Text in ALL CAPS indicates specific user/blog data sent by the system server in the request. The requests below are suitable for submission to http://wordpress.com/xmlrpc.php, which is the service end point for wordpress.com's API.

Sample request 1, using Blogger API: This XML requests the BLOG ID from Wordpress and other information associated with each blog belonging to a user account.

```
<?xml version="1.0" ?>
<methodCall>
    <methodName>blogger.getUsersBlogs</methodName>
    <params>
        <param><value><string>APPLICATION KEY</string></value>
        </param>
        <param><value><string>BLOG USER NAME</string></value>
        </param>
        <param><value><string>USER PASSWORD</string></value>
        </param>
    </params>
</methodCall>
```

Sample response 1, from wordpress: All text labeled VALUE indicates user/blog specific data returned to the system server from wordpress.com. Many <struct> nodes can be returned—each representing one blog owned by the user account. For an account with 1 blog, the response would appear as below, with one <struct> node containing information about the one blog. In order to determine which BLOG ID to capture, when multiple blogs are returned, the system server parses the returned data and compares and matches the data associated with the "url" tag with the blog url that the user supplied.

```
<?xml version="1.0"?>
<methodResponse>
  <params>
    <param>
     <value>
       <array><data>
    <value><struct>
    <member><name>isAdmin</name><value><boolean>VALUE
    </boolean></value></member>
    <member><name>url</name><value><string>VALUE</string></value>
    </member>
    <member><name>blogid</name><value><string>VALUE</string>
    </value></member>
    <member><name>blogName</name><value><string>VALUE</string>
    </value></member>
    </struct></value>
    </data></array>
      </value>
    </param>
  </params>
</methodResponse>
```

Sample Request 2 uses the same POST URL, but uses metaWebLog API "newPost" with the BLOG ID returned from the previous request. Everything between the HTM1 comments <!--Post Body created by clipmarks.com--> and <!--End Post Body--> represents the HTML of the blog post created by system server. The system server creates this post by combining the user supplied blog post title with the body of the clip they are blogging (i.e., with the selected content items). The body of the clip is retrieved from a system server database and stored as a string. A link back to the clip and to the home page for the system server are also added to the end of the Post Body.

```
<?xml version="1.0"?>
<methodCall>
   <methodName>metaWeblog.newPost</methodName>
   <params>
      <param><value><string>BLOG ID</string></value></param>
      <param><value><string>BLOG USER NAME</string></value></param>
      <param><value><string>BLOG PASSWORD</string></value></param>
      <param>
         <value>
            <struct>
               <member><name>dateCreated</name><value><dateTime>DATE CREATED</dateTime></value></member>
               <member><name>description</name><value><string>
                  <!-- Post Body created by clipmarks.com -->
                  <div style="margin: 12px 0px; border: solid 3px #31689B; padding: 6px 8px 8px 8px;">
                     <div><div style="padding: 3px; font-size: 11px; background: #f5f5f5; border: solid 1px #dcdcdc; border-width: 0px 1px 1px 0px; color: #666666; margin-bottom: 8px;"> clipped from <a href="http://clipmarks.com/clipmark/31F6365F-80D4-45B4-A42E-596ACCDDA2A2/" style="color:#0000ff;" target="_blank">clipmarks.com</a></div><img src="http://clipmarks.com/images/header/logo-clip.gif" alt="Clipmarks" width="165" height="26" /><br /></div></div><div style="margin: 12px 4px;"><table style="font-size: 11px;" cellpadding="0" cellspacing="0" width="100%"><tr><td><b><a href="http://clipmarks.com/clipmark/87FBFFE2-102A-44F9-B969-407805265530/">go to this clip</a></b></td><td align="right"><a href="http://clipmarks.com"><img src="http://clipmarks.com/images/powered-by-small.png" border="0" alt="powered by clipmarks" /></a></td></tr></table></div>
                  <!-- End Post Body -->
               </string></value></member>
               <member><name>title</name><value><string>BLOG POST TITLE</string></value></member>
            </struct>
         </value>
      </param>
      <param><value><boolean>1</boolean></value></param>
   </params>
</methodCall>
```

Step 2—Response—successfully posted, value returned is the BLOG POST ID for this post. (Note that HTTP status code pf 200 is always returned by blog service if post was successful)

```
<?xml version="1.0"?>
<methodResponse>
   <params>
      <param>
         <value>
            <string>21</string>
         </value>
      </param>
   </params>
</methodResponse>
```

While, as described above, it is preferable that the system server is employed to format the blog post, authenticate the user to the blog server and transmit the blog post, the computing device of the user may be employed to perform some or all of these steps. In this case, the plug-in for the computing device of the user would have code and/or data sufficient to perform the above steps (such as the current data format necessary to communicate with the receiving blog servers), or would receive such code and/or data from the server as necessary, and/or on a periodic basis.

Figure 37:
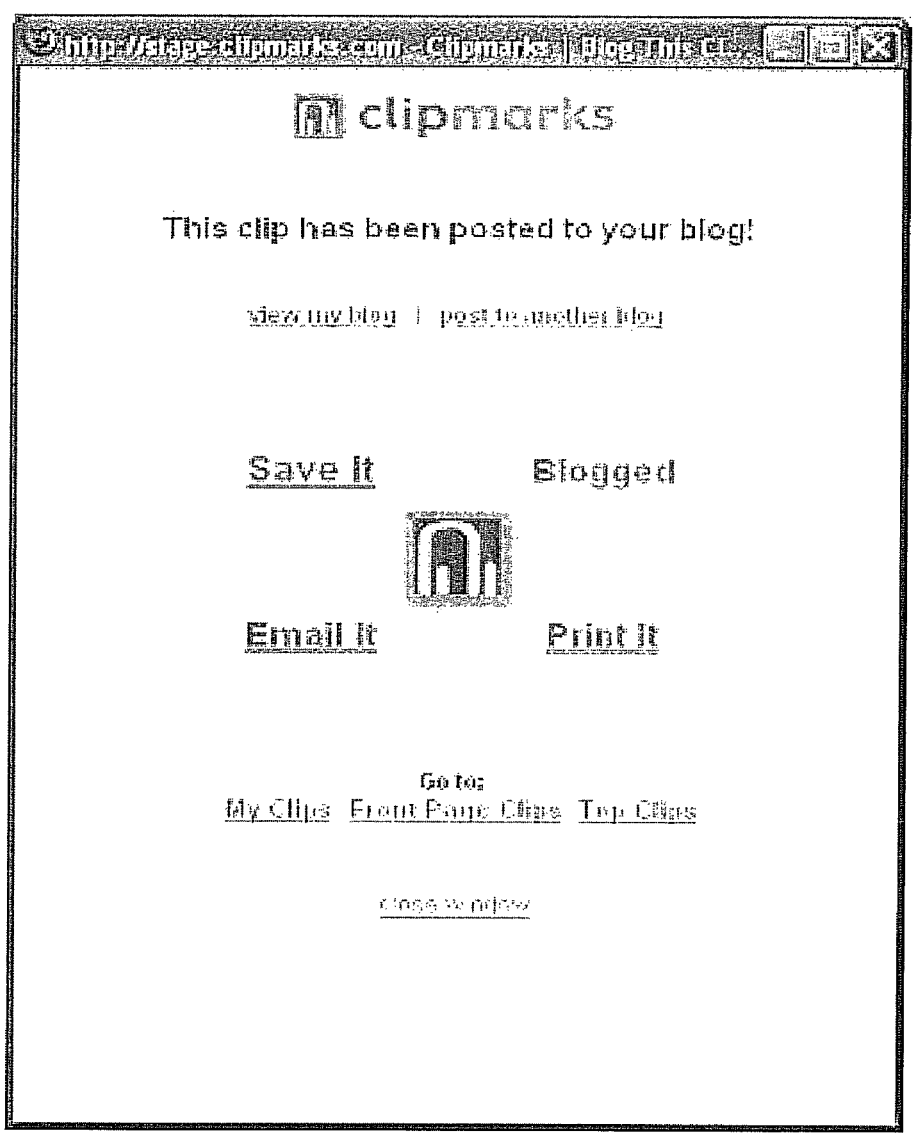

Referring to FIG. 37, if the post was successful, the system displays a post confirmation interface, which preferably provides links to allow the user to view the blog(s) to which the post was transmitted, to save the custom selection of content items on the system server, and/or to email or print the custom selection.

Figure 38:

Referring to FIG. 38, upon selection of the link to view the receiving blog, the blog web page is loaded in the browser application on the computing device of the user, showing the recent post.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed:

1. A system comprising:
one or more processors configurable to cause:
displaying content items in a web browser, each content item having content displayed according to one or more formatting tags;
identifying a first one of the displayed content items having first content displayed according to at least a first formatting tag, the first content item having dimensions comprising a height and a width;
identifying access credentials for accessing one or more content posting services, the access credentials comprising a user name and a first network address;
accessing the one or more content posting services using the access credentials;
processing publication information associated with the one or more content posting services, the publication information comprising an identifier and a second network address;
determining that the second network address of the publication information matches the first network address of the access credentials;
selecting, responsive to determining that the second network address matches the first network address, the identifier of the publication information;
generating a post including the first content item according to:
the selected identifier, and
the dimensions;
displaying the post in a preview interface, the preview interface enabling:
user entry, user modification and user deletion of content in the post including the first content item, and user selection of each of the one or more content posting services; and providing the post for posting on the one or more content posting services.

2. The system of claim 1, wherein the content items are included as part of one or more of: a web page, a document, or a spreadsheet.

3. The system of claim 1, wherein the post comprises a Hypertext Markup Language (HTML) description.

4. The system of claim 3, wherein the HTML description includes one or more of: a post title, an HTML layout tag, or styling information.

5. The system of claim 1, wherein the access credentials further include a service provider name.

6. The system of claim 1, wherein the one or more content posting services are accessed using an application programming interface (API).

7. The system of claim 1, wherein the post includes a link referencing the first content item.

8. A computer processor implemented method comprising:
- causing display of content items in a web browser, each content item having content displayed according to one or more formatting tags;
- identifying a first one of the displayed content items having first content displayed according to at least a first formatting tag, the first content item having dimensions, the dimensions comprising a height and a width;
- identifying access credentials for accessing one or more content posting services, the access credentials comprising a user name and a first network address;
- accessing the one or more content posting services using the access credentials;
- processing publication information associated with the one or more content posting services, the publication information comprising an identifier and a second network address;
- determining that the second network address of the publication information matches the first network address of the access credentials;
- selecting, responsive to determining that the second network address matches the first network address, the identifier of the publication information;
- generating a post including the first content item according to:
  - the selected identifier, and
  - the dimensions;
- causing display of the post in a preview interface, the preview interface enabling:
  - user entry, user modification and user deletion of content in the post including the first content item, and
  - user selection of each of the one or more content posting services; and
- providing the post for posting on the one or more content posting services.

9. The method of claim 8, wherein the content items are included as part of one or more of: a web page, a document, or a spreadsheet.

10. The method of claim 8, wherein the post comprises a Hypertext Markup Language (HTML) description.

11. The method of claim 10, wherein the HTML description includes one or more of: a post title, an HTML layout tag, or styling information.

12. The method of claim 8, wherein the access credentials further include a service provider name.

13. The method of claim 8, wherein the one or more content posting services are accessed using an application programming interface (API).

14. The method of claim 8, wherein the post includes a link referencing the first content item.

15. A computer program product comprising computer-readable program code to be executed by at least one processor when retrieved from a non-transitory computer-readable medium, the program code comprising instructions configurable to cause:
- displaying content items in a web browser, each content item having content displayed according to one or more formatting tags;
- identifying a first one of the displayed content items having first content displayed according to at least a first formatting tag, the first content item having dimensions, the dimensions comprising a height and a width;
- identifying access credentials for accessing one or more content posting services, the access credentials comprising a user name and a first network address;
- accessing the one or more content posting services using the access credentials;
- processing publication information associated with the one or more content posting services, the publication information comprising an identifier and a second network address;
- determining that the second network address of the publication information matches the first network address of the access credentials;
- selecting, responsive to determining that the second network address matches the first network address, the identifier of the publication information;
- generating a post including the first content item according to:
  - the selected identifier, and
  - the dimensions;
- displaying the post in a preview interface, the preview interface enabling:
  - user entry, user modification and user deletion of content in the post including the first content item, and
  - user selection of each of the one or more content posting services; and
- providing the post for posting on the one or more content posting services.

16. The computer program product of claim 15, wherein the content items are included as part of one or more of: a web page, a document, or a spreadsheet.

17. The computer program product of claim 15, wherein the post comprises a Hypertext Markup Language (HTML) description.

18. The computer program product of claim 17, wherein the HTML description includes one or more of: a post title, an HTML layout tag, or styling information.

19. The computer program product of claim 15, wherein the access credentials further include a service provider name.

20. The computer program product of claim 15, wherein the one or more content posting services are accessed using an application programming interface (API).

* * * * *